(12) United States Patent
Sharma et al.

(10) Patent No.: US 12,339,748 B2
(45) Date of Patent: Jun. 24, 2025

(54) TEMPLATE-BASED CONFIGURATION FOR BACKUP AND RESTORE APPLICATIONS IN PUBLIC CLOUDS

(71) Applicant: Dell Products L.P., Round Rock, TX (US)

(72) Inventors: Shefali Sharma, San Jose, CA (US); Durga Prasad Thorati, Gilroy, CA (US); Fei Wang, Sunnyvale, CA (US)

(73) Assignee: Dell Products L.P., Round Rock, TX (US)

( * ) Notice: Subject to any disclaimer, the term of this patent is extended or adjusted under 35 U.S.C. 154(b) by 63 days.

(21) Appl. No.: 18/339,625

(22) Filed: Jun. 22, 2023

(65) Prior Publication Data

US 2024/0427670 A1 Dec. 26, 2024

(51) Int. Cl.
| | |
|---|---|
| *G06F 11/00* | (2006.01) |
| *G06F 11/07* | (2006.01) |
| *G06F 11/14* | (2006.01) |
| *H04L 9/40* | (2022.01) |

(52) U.S. Cl.
CPC ...... *G06F 11/1464* (2013.01); *G06F 11/0793* (2013.01); *G06F 11/1435* (2013.01); *H04L 63/102* (2013.01)

(58) Field of Classification Search
CPC ............ G06F 11/1464; G06F 11/0793; G06F 11/1435; G06F 11/1466; G06F 11/1458; G06F 11/079; G06F 11/3086
See application file for complete search history.

(56) References Cited

U.S. PATENT DOCUMENTS

2023/0315580 A1* 10/2023 Hendrey ............ G06F 11/1464 711/162

* cited by examiner

*Primary Examiner* — Katherine Lin
(74) *Attorney, Agent, or Firm* — Dergosits & Noah LLP; Todd A. Noah

(57) ABSTRACT

Providing template-based configuration for backup and restore applications in public clouds is described. A system identifies a deployment of an instance of a backup and restore application in a public cloud, and retrieves a configuration template, generated for the backup and restore application, from within the public cloud. The system retrieves restricted access data, which is excluded from the configuration template, from a secret manager service provided by a cloud provider associated with the public cloud. The system configures the instance of the backup and restore application based on the configuration template, generated for the backup and restore application, and the restricted access data, thereby initiating execution of the configured instance of the backup and restore application to back up a workload.

20 Claims, 14 Drawing Sheets

FIG. 11
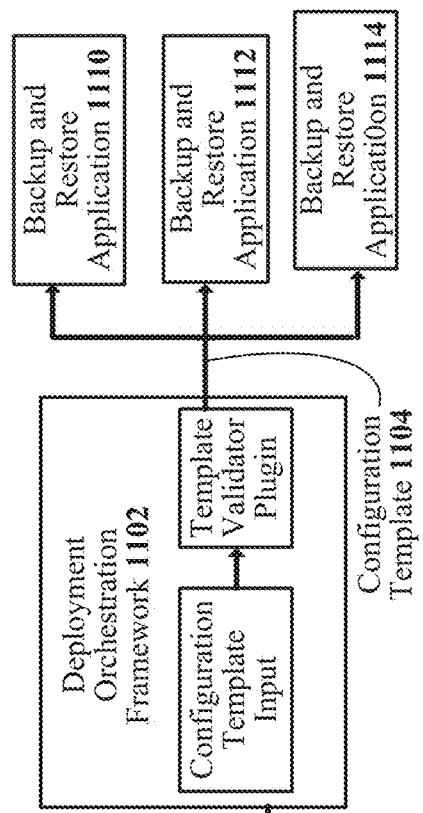
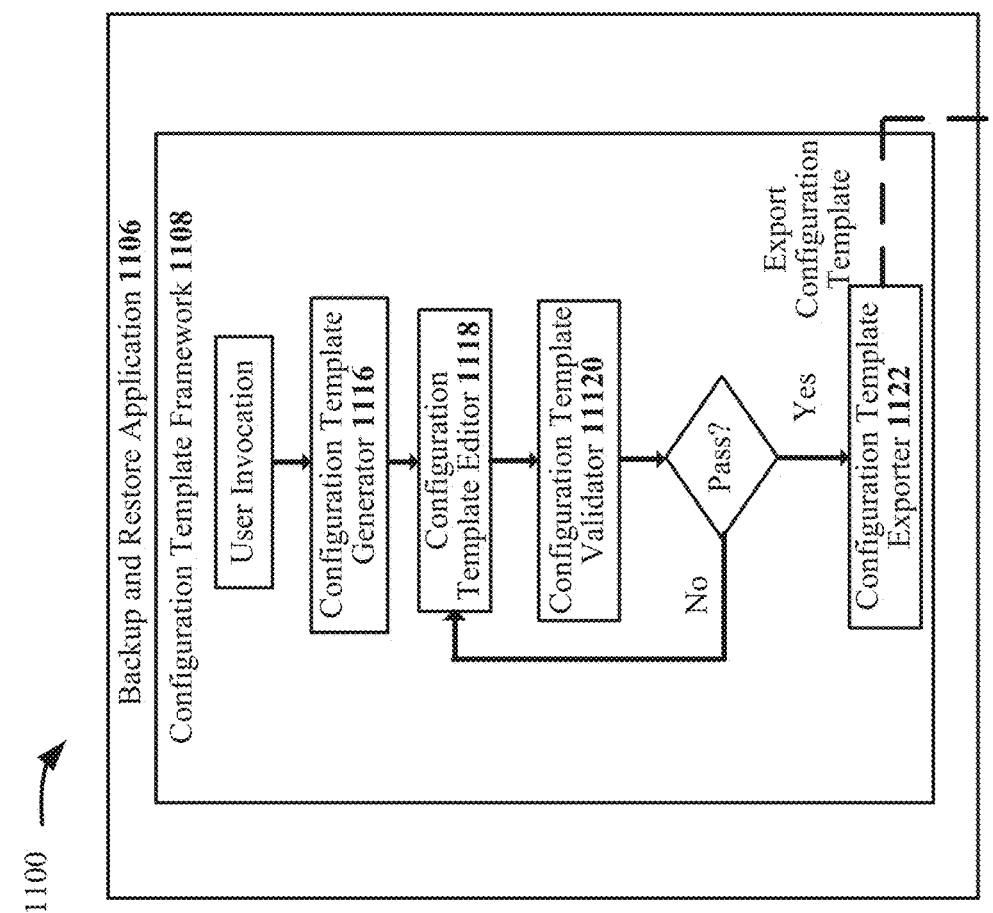

TEMPLATE-BASED CONFIGURATION FOR BACKUP AND RESTORE APPLICATIONS IN PUBLIC CLOUDS

BACKGROUND

A data object may be a set of information that is backed up as a unit. If a software error corrupts a data object, or if erroneous data updates the data object, a data protection administrator may restore the data object to a previous state that does not include the corrupted or erroneous data. A backup and restore application performs a backup operation either occasionally or continuously to enable this restoration, storing a copy of each desired data object state (such as the values of the data object and the embedding of these values in a database's data structures) within dedicated backup files. When the data protection administrator decides to reinstate the data object to a previous state, the data protection administrator specifies the desired previous state by identifying a desired time when the data object was in this previous state, and then instructs the backup and restore application to perform a restore operation to restore a copy of the corresponding backup file(s) for that previous state to the data object.

A backup and restore application may be provided via cloud computing, which can be a type of Internet-based processing that remotely provides shared processing resources and data to processors and other devices on demand. Cloud computing can be used as a model for enabling ubiquitous, on-demand access to a shared pool of configurable processing resources (such as networks, servers, storage, applications, and services), that may be rapidly provisioned and released with minimal management effort. Cloud computing and storage solutions can provide individual users and enterprises with various capabilities to store and process their data in third-party data centers that may be located far from a user, ranging in distance from across a city to across the world. Cloud computing can rely on sharing of resources to achieve coherence and economy of scale. An enterprise can use cloud computing to scale up as processing needs increase and then scale down again as processing demands decrease.

An end user can use a client device to request the creation of a virtual machine environment, which may be created in a cloud computing environment or any other processing environment that enables the creation of a requested virtual machine environment. A virtual machine environment may be the overall structure within which an emulated computer operates. Examples of virtual machine environments include a single virtual machine and include multiple virtual machines that function as a load balancer, two or more application servers, which may execute backup and restore applications, a database server, and a storage server.

A data object and/or a backup file may be stored on a cloud storage system, which can be a model of data storage in which digital data is stored in logical pools, with the physical storage spanning multiple servers, and often locations, and the physical environment typically owned and managed by a hosting company. A cloud storage provider is responsible for keeping the stored data available and accessible, and the physical environment protected and running. People and organizations buy or lease storage capacity from a cloud storage provider to store user, organization, and/or application data. Cloud storage services may be accessed through a co-located cloud computing service, a web service application programming interface (API), or by applications that utilize a web service API, such as cloud desktop storage, a cloud storage gateway, or Web-based content management systems.

Data storage systems include recording media that retain digital information, have evolved towards scalable designs that can grow with customer demand by adding storage and computation as necessary, and typically store redundant information. For example, when creating a copy of an enterprise's email system data which includes 100 instances of the same 1 Megabyte (MB) data backup file attachment, a data storage system could store all 100 instances of the same 1 MB data backup file attachment, inefficiently using 100 MB of storage space to store the same 1 MB data backup file attachment. Data deduplication can eliminate redundant copies of information, which can improve the utilization of data storage systems and lower capital expenditure by reducing the total amount of recording media required to meet the capacity needs of data storage systems. Continuing the previous example, a data deduplication system stores only one instance of the same 1 MB data backup file attachment and stores small references to the one stored instance for the 99 subsequent instances.

Enterprises of different sizes in various industries, such as finance, telecommunications, and healthcare, are moving their computing and storage resources to the cloud. Such resources can reduce up-front capital expenditure investments and maintenance costs. Since their primary workloads have been moved to the cloud these enterprises now need data protection in the cloud.

Backup and restore applications, such as Dell's Data Domain Virtual Edition, offer cost-optimized data protection solutions that backup and restore data in a public cloud. Data Domain Virtual Edition is a software-only deduplication appliance that provides data protection for entry and enterprise environments. A Data Domain Virtual Edition instance can run on a customer's premises and/or in a public cloud such as Amazon Web Services, Azure, or Google Cloud Platform. Although the current disclosure describes Dell's Data Domain Virtual Edition as an example of a data backup and restore system or a backup and restore application, features of the current disclosure are not limited to the use of any data backup and restore system or backup and restore application.

Enterprise customers often need to do a bulk deployment of backup and restore application instances in public clouds to meet their workload requirements. For enterprise customers, a key requirement for embracing a large-scale deployment of backup and restore application instances in one or more public clouds is the ability to efficiently configure backup and restore application instances through their own deployment orchestration framework. Currently, customers have the following options to configure backup and restore application instances through their deployment orchestration framework. Each option comes with significant challenges for the customers, as is described in detail below.

Some customers have developed scripts by directly using the Data Domain command line interface commands and are using those scripts to automate the configuration of a backup and restore application instance, such as a Data Domain Virtual Edition instance. For some of the configuration steps, customers need to write Expect scripts to capture the command line interface output and use it. This level of expertise is cumbersome, error-prone and very difficult to maintain because if the output of the command changes, the output may end up breaking the customer's scripts.

Many backup and restore applications support REST (Representational State Transfer) API's (Application Programming Interface) which may be used to configure a backup and restore application instance and could be integrated with the customer's deployment orchestration framework. This integration is incredibly challenging for customers as they need to integrate a significant amount of REST API's and understand the functionality of each of those API's to configure the backup and restore application instance. This requires a significant configuration effort for customers to develop and use this as solution with their deployment orchestration framework.

It is possible for customers to use Data Domain Management Center for configuring backup and restore application instances, such as Data Domain Virtual Edition instances, but many customers do not select the option for using Data Domain Management Center. One reason that customers express for not selecting to use a Data Domain Management Center instance to configure a backup and restore application instance is because such a selection seems to be an unwarranted additional cost and management overhead for the customers. Instead of using Data Domain Management Center, most enterprise customers prefer to use their own deployment orchestration framework solution(s) for configuring, deploying, and managing backup and restore application instances.

BRIEF DESCRIPTION OF THE DRAWINGS

FIG. 11 illustrates a block diagram of an example system that depicts a configuration template export process, under an embodiment;

DETAILED DESCRIPTION

Figure 1:
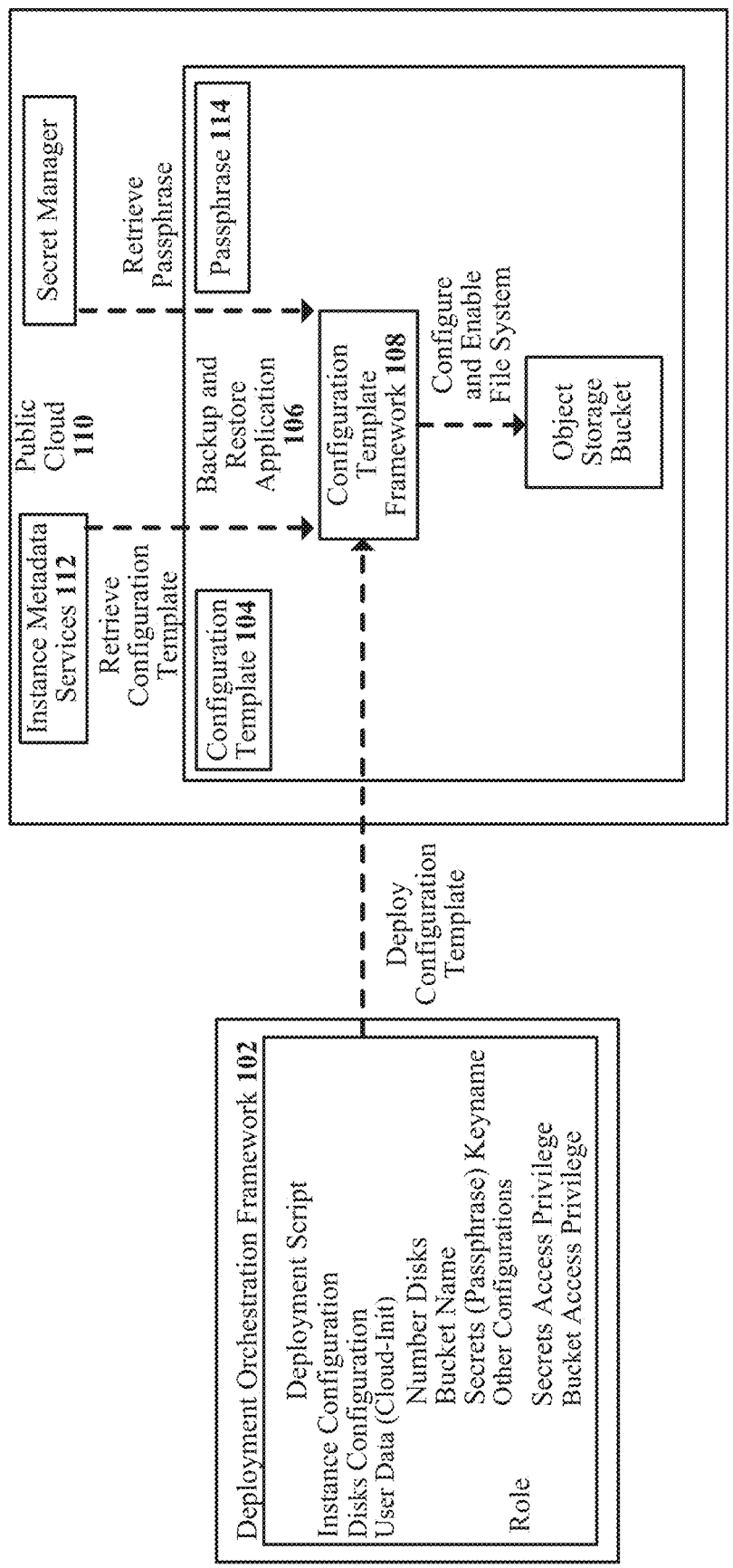
FIG. 1 illustrates a block diagram of an example system in which a public cloud provider provisions a configuration template through an instance metadata service, under an embodiment.

Another potential solution is using cloud-init, which is a commonly used industry standard method for cross platform cloud instance initialization, which is supported by all major public cloud providers. During boot, cloud-init identifies the cloud platform it is running on and customizes the initialization of the instance(s) accordingly. Cloud instances can automatically be provisioned during a first boot with networking, storage, secure shell protocol keys, packages and various other system aspects already configured, using a solution that is suited for executing standard Linux commands during the boot process through user provided scripts. However, enabling cloud-init to completely configure backup and restore application instances such as Data Domain Virtual Edition instances is particularly challenging for the following reasons.

Even if cloud-init is made to work for backup and restore applications, there will be the same challenges in implementing and maintaining as with using Data Domain's command line interface commands to do the configuration. For example, customers would need to write Expect 1 scripts to capture the cloud-init output and use it for some of the configuration steps, which would be scripts that are very difficult to maintain because if the output changes, the changed output may end up breaking the customer's scripts. Such a solution would be cumbersome and error prone for customers to use. Cloud-init lacks some of the features, such as a feedback mechanism to report each configuration status back to a user, and is not flexible for error handling mechanisms to take corrective steps and reapply the configuration Cloud-init is not suitable for the Data Domain Virtual Edition's configuration because the Data Domain Virtual Edition is a closed system, and users are not allowed to run any bash commands due to the possibility of security breaches. If cloud-init was used for the Data Domain Virtual Edition's configuration, there would be security risks involved with a user being able to run bash commands through the cloud-int scripts.

To address the above problems, embodiments of the present disclosure offer an alternative method which still leverages cloud-init technology. but only to pass a configuration template from a deployment orchestration framework to the backup and restore application instance during its deployment. After deployment, the configuration template framework has no dependency on cloud-init to do the configuration. When processing template data to configure a backup and restore application, a configuration template framework provides custom plugins that make it much easier for a customer to integrate in their deployment orchestration framework. Instead of passing sensitive data as plain text in a configuration template, the configuration template framework uses a cloud provider's secret manager service to store and access system passphrase and user passwords.

A configuration template framework also enables customers to export the configuration from an instance of an existing backup and restore application to be applied on another instance of the backup and restore application. This configuration template framework provides a solution to integrate the configuring of instances of backup and restore applications along with the deploying of these instances so that the backup and restore application becomes completely functional after the deployment process completes.

Embodiments herein provide template-based configuration for backup and restore applications in public clouds. A system identifies a deployment of an instance of a backup and restore application in a public cloud, and retrieves a configuration template, generated for the backup and restore application, from within the public cloud. The system retrieves restricted access data, which is excluded from the configuration template, from a secret manager service provided by a cloud provider associated with the public cloud. The system configures the instance of the backup and restore application based on the configuration template, generated for the backup and restore application, and the restricted access data, thereby initiating execution of the configured instance of the backup and restore application to back up a workload.

For example, a configuration template framework for a Data Domain Virtual Edition instance identifies that a deployment orchestration framework deployed an instance of the Data Domain Virtual Edition in a Google Cloud Platform. Then the configuration template framework retrieves a configuration template from the Google Cloud Platform's instance metadata service, where it had been stored after being created by a configuration template generator. Since the Data Domain Virtual Edition's access system passphrases and user passwords would be at risk of unauthorized access if they were provided as part of the configuration template stored in the Google Cloud Platform's instance metadata service, the configuration template framework retrieves the Data Domain Virtual Edition's system passphrase and user passwords from the Google Cloud Platform's highly secure secret manager service. Next, the configuration template framework uses both the configuration template and the system passphrases and user passwords to configure the instance of the Data Domain Virtual Edition, which initiates execution by an enterprise's production system for backing up enterprise data.

FIG. 1 illustrates a block diagram of an example system 100 in which a public cloud provider provisions a configuration template through an instance metadata service, under an embodiment. The system 100 depicts a deployment orchestration framework 102 that provides a configuration template 104 for an instance of a backup and restore application 106, which includes a configuration template framework 108 that execute stages in applying the template 104 to the application 106. The deployment orchestration framework 102 is based on cloud-init, and can use a generator or an editor provided by a configuration template framework 108 to generate the configuration template 104 for configuring the instance of the backup and restore application 106. The configuration template 104 may be a single JSON file and can be added to the user data section of the deployment orchestration framework 102, which can deploy the instance of the backup and restore application 106 in a public cloud 110. Based on the public cloud provider implementation, a cloud-init package can make the configuration template 104 eventually available inside an instance of the backup and restore application 106 either initially through the instance metadata service 112 or stored at a specific location in the instance of the backup and restore application 106. After the instance of the backup and restore application instance 106 boots up, the configuration template framework 108 can retrieve the configuration template 104 from the instance metadata service 112, parse it, and apply the specified configuration to the instance of the backup and restore application 106. After the successful application of the configuration template 104 to the instance of the backup and restore application 106, the filesystem is up and running and the instance of the backup and restore application 106 is ready to handle backup and restore workloads.

Bringing up the backup and restore application 106 in the public cloud 110 requires a deeply customized configuration procedure. Existing solutions that are used to configure virtual machines in a public cloud, such as cloud-init, are difficult to use because of the complex configuration required for a purpose-built appliance like the backup and restore application 106. By passing the configuration information for the backup and restore application 106 as a template to the user data section of the deployment orchestration framework 102, the system 100 can leverage the cloud-init software and pass the configuration template 104 to the instance of the backup and restore application 106, where the configuration template framework 108 for the instance of the backup and restore application 106 can use the configuration template 104 to preconfigure the instance of the backup and restore application 106. No other solution currently exists that allows customers to use their own deployment orchestration framework 102 to preconfigure an instance of the backup and restore application 106 to its completion.

Furthermore, the system 100 can fully integrate an instance of the backup and restore application 106 to become fully configured and operational at the end of the deployment process by using the cloud provider's secret manager service that securely stores and communicates a passphrase 114 to solve the problem of embedding passwords in plain text in the configuration template 104, such that there is no need to pass any sensitive data in plain text in the configuration template 104. The configuration template framework 108 enables a user to edit and export the configuration template 104 of an existing instance of the backup and restore application 106, so that this exported configuration template 104 can then be reused for configuring future instances of the backup and restore application 106, thereby helping customers to quickly configure many new instances of the backup and restore application 106.

The deployment orchestration framework 102 is responsible for specifying the configuration template 104 for configuring the instance of the backup and restore application 106. The deployment orchestration framework 102 is also responsible for allocating the required cloud resources, such as buckets, metadata disks, and object store access policies. To facilitate these additional features, the configuration template framework 108 can provide custom plugins which may be easily integrated with customers' deployment orchestration framework 102.

Figure 2:
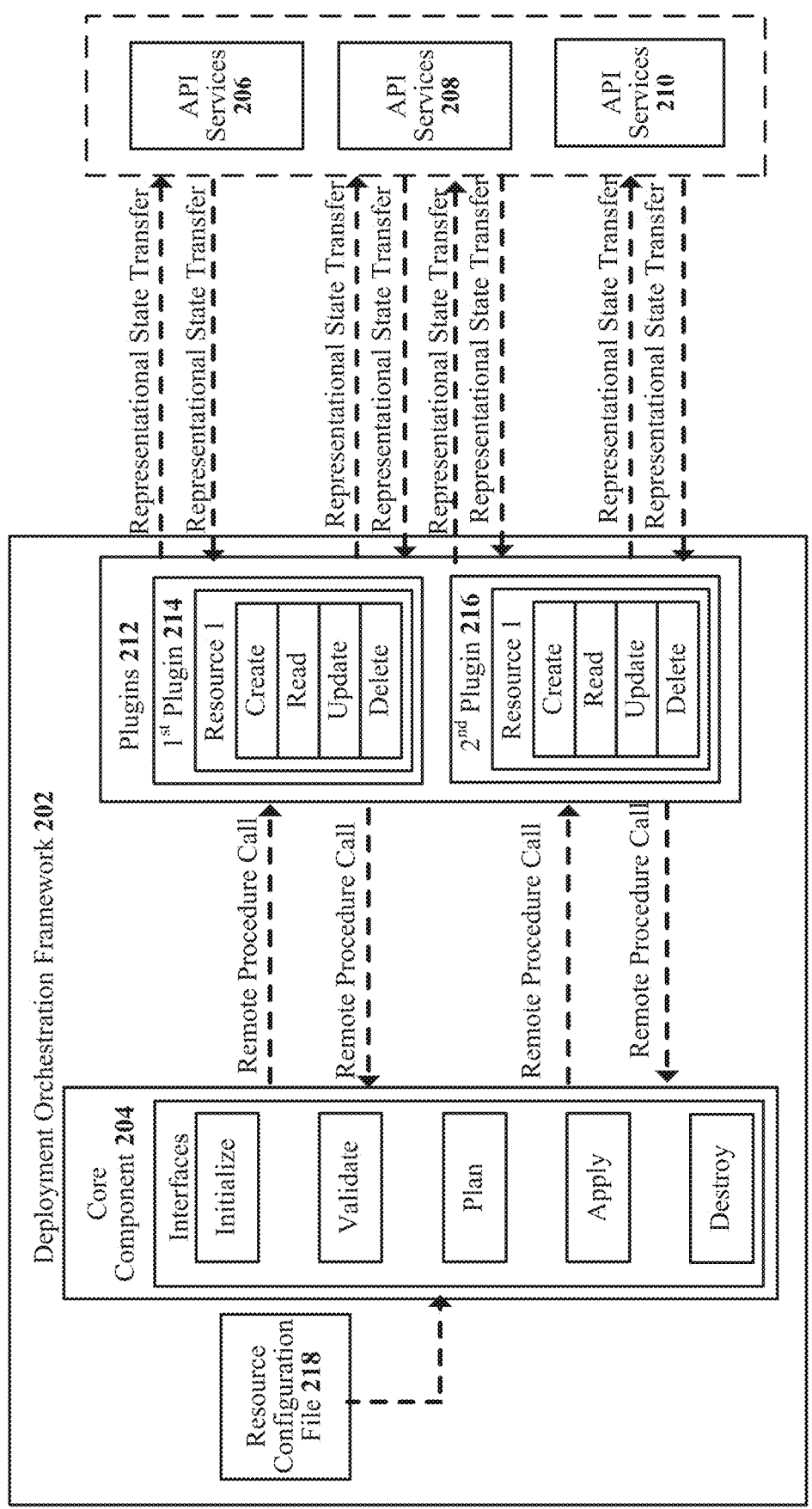
FIG. 2 illustrates a block diagram of an example system that depicts a core component and plugins in a deployment orchestration framework that communicates via API services under an embodiment.

FIG. 2 illustrates a block diagram of an example system 200 that depicts a core component and plugins in a deployment orchestration framework that communicates via API services, under an embodiment. A deployment orchestration framework 202 includes a core component 204 that manages all the infrastructure resources. The core component 204 can provide common interfaces to interact with different cloud providers, Software as a Service (SaaS), services, and other third-party API services, such as the API services 206, 208, and 210. The plugins 212, which include a first plugin 214 and a second plugin 216, provide a means to expand the core functionality of the deployment orchestration framework 202. These custom plugins 212 can be developed and integrated with the deployment orchestration framework 202 to communicate with the API services 206, 208, and 210 using the Representational State Transfer (REST) protocol. The communication between the core component 204 and the plugins 212 can use remote procedure calls.

The plugins 212 act as the bridge between the core component 204 of the deployment orchestration framework 202 and the target API services 206, 208, and 210 by identifying a set of resources along with their schemas, and implementing create, read, update, and delete (CRUD) operations for these resources. The core component 204 processes the resource configuration file 218 (which may be in the JSON format or the YAML format) for a plugin and issues commands to the corresponding plugin to take actions for allocating and configuring these resources. For example, any of the plugins 212 acts by invoking the corresponding CRUD operation for the resource and sending the requests to the corresponding API service.

Figure 3:
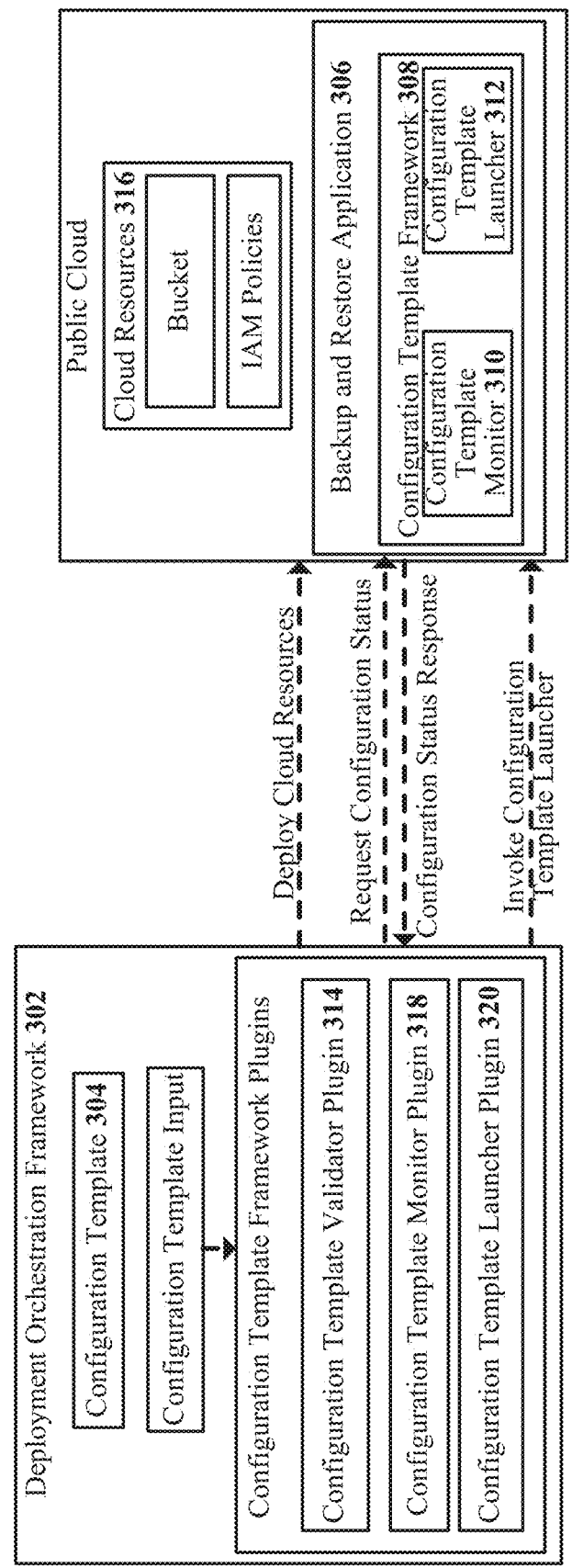
FIG. 3 illustrates a block diagram of an example system that depicts the functionality of configuration template framework plugins in a deployment orchestration framework, under an embodiment.

FIG. 3 illustrates a block diagram of an example system 300 that depicts the functionality of configuration template framework plugins in a deployment orchestration framework, under an embodiment. The system 300 depicts a deployment orchestration framework 302 that provides a configuration template 304 for an instance of a backup and restore application 306, which includes a configuration template framework 308 that boots up a monitor 310 that invokes a launcher 312 that launches components which execute stages in applying the template 304 to the application 306. The configuration template framework 308 provides the following custom plugins to the deployment orchestration framework 302. The deployment orchestration framework 302 can pass the configuration template 304 to the configuration template validator plugin 314, which can check the validity of the configuration and cloud resources 316, which is specified in the configuration template 304, by capturing any static configuration errors such as missing or invalid key pair values in the configuration template 304. The configuration template validator plugin 314 can also help to minimize failures related to use of the cloud resources 316 for the configuration of the instance of the backup and restore application 306. For example, the configuration template validator plugin 314 checks that the policy for object store access has all the required privileges for bucket access. If the validation fails, the corresponding cloud resources 316 and/or the configuration template 304 might need to be updated to correct the problem. If the validation succeeds, the deployment orchestration framework 302 can proceed to deploy an instance of the backup and restore application 306.

After an instance of the backup and restore application 306 is configured, the deployment orchestration framework 302 invokes a configuration template monitor plugin 318 to query the status of the configuration of the instance of the backup and restore application 306 from the configuration template monitor 310. The configuration template monitor plugin 318 provides a user with detailed error message(s) and corrective action in case of configuration failure. If the configuration of an instance of the backup and restore application 306 is not successful, the user needs to correct the error reported by the configuration template monitor plugin 318. After correcting the error, the deployment orchestration framework 302 can use a configuration template launcher plugin 320 to reinvoke the configuration template launcher 312.

Figure 4:
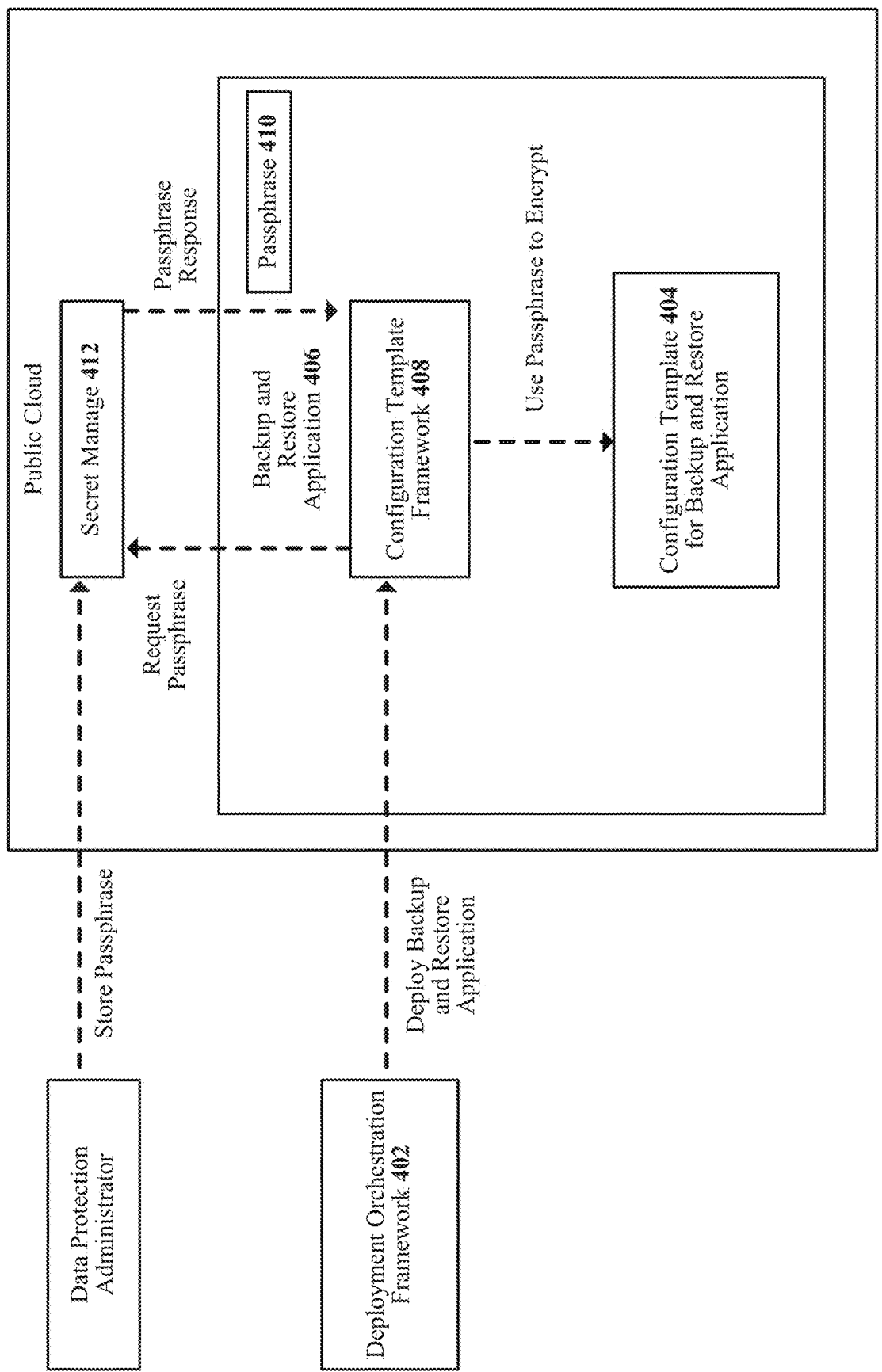
FIG. 4 illustrates a block diagram of an example system which uses a secret manager to store a system passphrase and retrieve it during the configuration of an instance of a backup and restore application, under an embodiment.

FIG. 4 illustrates a block diagram of an example system 400 which uses a secret manager to store a system passphrase and then provide it during the configuration of an instance of a backup and restore application, under an embodiment. The system 400 depicts a deployment orchestration framework 402 that provides a configuration template 404 for an instance of a backup and restore application 406, which includes a configuration template framework 408 that execute stages in applying the template 404 to the application 406. Cloud-init supports different sources for configuration, such as the Distro providers' cloud-init configuration directory for doing static or run-time configuration. Another source for cloud-init configuration is a data source, which is a source of configuration data for cloud-init that typically comes from a user (such as user data) or comes from the cloud that created the configuration drive (such as metadata). Typical user data includes files, YAML, and shell scripts, whereas typical metadata includes a server name, an instance identifier, a display name, and other cloud specific details. Every platform supporting cloud-init provides a method for supplying user data to a virtual machine instance.

The configuration template 404 can be provided as an input to the user data section of the deployment orchestration framework 402. Each cloud provider has a different mechanism with which they use cloud-init technology to provision the user data inside a deployed instance of a backup and restore application 406. Some cloud providers use the instance metadata service to fetch the user data, while other cloud providers use agents or other software to store the user data in a specific location on the deployed instance of the backup and restore application 406. Once an instance of a backup and restore application 406 has booted up, the configuration template framework 408 can retrieve the configuration template 404 from the instance metadata service or from a stored location in the deployed instance of the backup and restore application 406. All the subsequent figures in this disclosure depict an example of a public cloud provider that provisions a configuration template 404 through an instance metadata service.

One of the challenges with template-based configuration of a deployed instance of a backup and restore application 406 is handling of sensitive data such as a system passphrase 410 and/or user passwords. Sending such restricted access data in clear text in the configuration template 404 is not an option because of security reasons. Each public cloud provider has a secret manager 412 to address similar issues and create sensitive data (such as passwords, credentials, and API keys) as a "secret." Cloud providers support the restricting of access to the secret using identity and access management (IAM) policies to meet the customers' security requirements. For example, an identity and access management policy may be defined to restrict access of a secret to a specific user or a specific virtual machine instance. The secret manager 412 is leveraged in this solution to create the system passphrase 410 and user passwords as a secret and later retrieve them from the secret manager 412 as needed during the configuration of an instance of the backup and restore application 406.

An example of a secret manager 412 that can store the system passphrase 410 and provide it during the configuration of a backup and restore application instance is a Google Cloud Platform's secret manager 412, which supports storage, management and access of secrets as binary blobs or text strings. A user needs to have the required identity and access management permissions to access and view the secret data. In a Google Cloud Platform, a secret is an object that has a project global scope and consists of a collection of metadata and secret versions.

Secret metadata has information such as access permissions, rotation policy, encryption type, labels, etc., and may be modified as needed. The secret versions store the actual secret data such as passwords, API keys, the state of the secret data (such as enabled/disabled/destroyed) and its metadata. The secret data is immutable, and operations mostly take place on secret versions. For example, to add a new value to a secret object, a new secret version can be created.

The secret manager 412 performs versioning of the secret data using the secret versions. A specific secret version may be requested by providing its version-identifier in the request. The response for a secret version request returns the contents of the secret and additional metadata about the secret. A user with the right identity and access management privileges can use the secret manager service to create a secret, set its metadata properties and assign a secret version to it. To retrieve the secret data inside the application, the user can fetch the secret version with the identifier corresponding to secret data from the secret manager 412.

An Azure key vault is a cloud service for securely storing and accessing secrets and provides a solution for secrets management. A secret is defined as any entity that needs tight control over its access, such as API keys, passwords, certificates, or cryptographic keys. The containers that are used for storing software, HSM-backed keys, secrets, and certificates are known as vaults. The use of a key vault eliminates the need to store security credentials in applications.

Access to a key vault is only granted after an Azure user has been authenticated and is authorized to access the key vault services. Authentication is done through the Azure Active Directory Service, and authorization is done through Azure role-based access or key vault access policies. Keys, secrets, or certificates stored in the key vault are called objects. Whenever an object is created, it is assigned a unique version identifier and is called the current version of the object.

Whenever a new instance of this Azure object is created with the same object name, the new instance gets a new version identifier, and becomes the new current version of the object. Each version of an object is allocated a unique identifier and a URL (Uniform Resource Locator). Objects are uniquely identified within a key vault using a URL and the complete URL of an object is called the object identifier. The URL consists of a prefix that identifies the key vault, the object type, the user-provided object name, and an object version. To use the key vault service, a user can first create a key vault in a resource group, and add a secret object to the vault, which becomes the current version of the object, and has its unique object identifier (URL). Using this object identifier, the user can then access the secret inside an application.

For Amazon Web Services, a secrets manager web service helps in replacing the hardcoded credentials in an application with an API calling to the secret manager web service to retrieve the credentials programmatically. The secrets manager web service uses the identity and access management permission policies to ensure that only authorized users can access or modify a secret. In the secrets manager web service, a secret consists of secret information, the secret value (which may be a string or binary), plus metadata about the secret. The secrets manager web service stores sensitive text in the encrypted secret value portion of the secret. The secrets manager web service encrypts the protected text of a secret by using the Amazon Web Service's key management service.

When encrypting secret data, the secrets manager web service requests the key management service to generate an encrypted data key, and stores the encrypted data key with the protected secret data. Whenever the secret needs decryption, the secrets manager web service requests the key management service to decrypt the data key, which the secrets manager web service then uses to decrypt the protected secret data. The secret metadata contains an Amazon resource name, a secret name, a rotation, and expiration settings. A secret manager web service uses an Amazon resource name for an encryption key to encrypt and decrypt the secret data. A secret can have copies of the encrypted secret data, called versions. When a secret is modified or rotated, the secrets manager web service creates a new version of the secret.

By default, Amazon Web Services' secrets manager web service always returns the current version of the secret unless a specific version is requested. To use the secrets manager web service, the user can first create a secret, and during the creation, the user can specify the encryption key management service method (Amazon Web Services managed or custom managed), rotation policy, resource permissions, etc. Once the secret manager web service has successfully created the secret, the user can retrieve it programmatically in an application by providing the secret version and the secret Amazon resource name.

Figure 5:
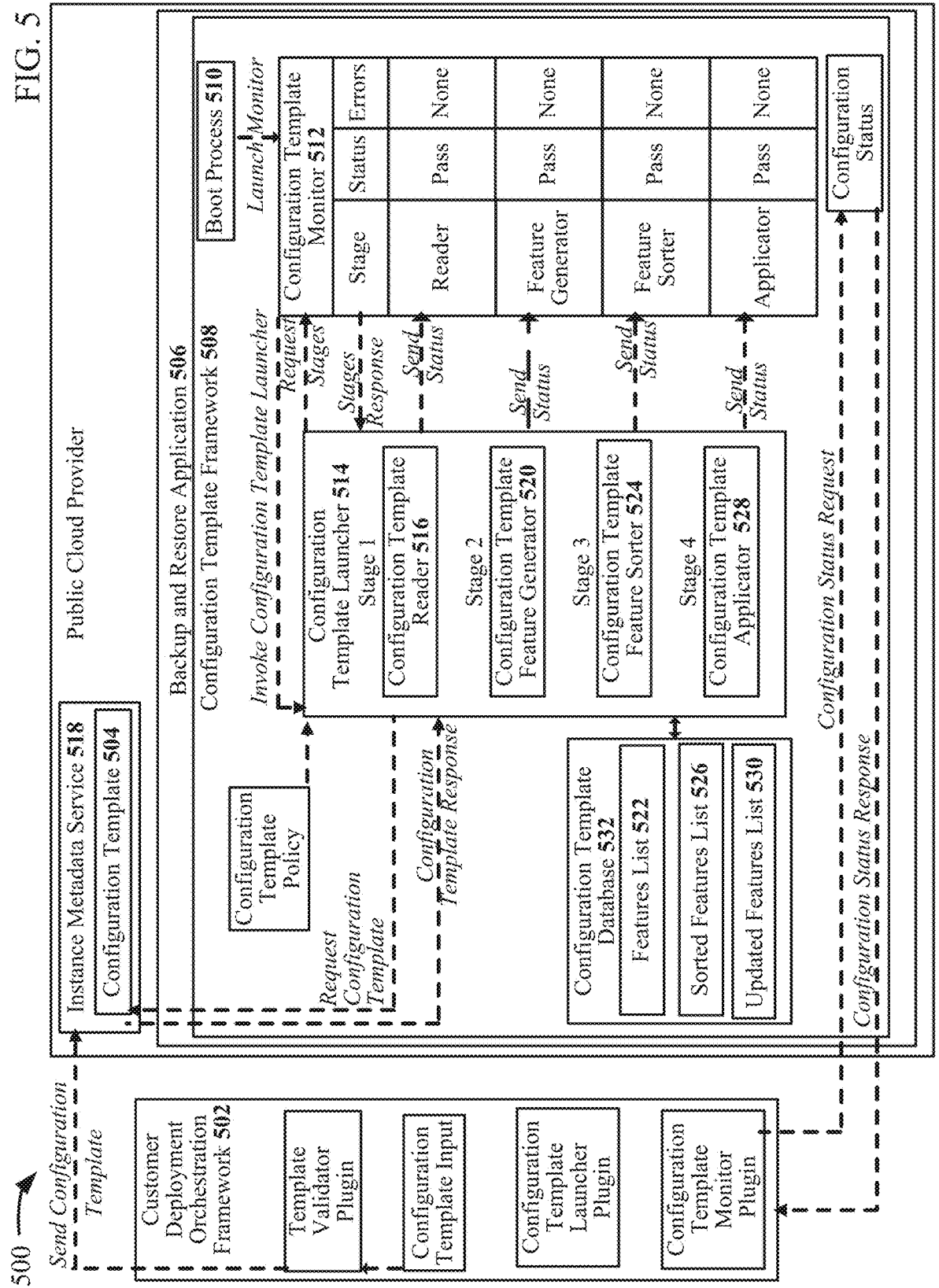
FIG. 5 illustrates a block diagram of an example system that depicts launching components which execute stages in configuring an instance of an application with a template, under an embodiment.

FIG. 5 illustrates a block diagram of an example system 500 which illustrates launching components which execute stages in configuring an instance of an application with a template, under an embodiment. The system 500 depicts a deployment orchestration framework 502 that provides a configuration template 504 for an instance of a backup and restore application 506, which includes a configuration template framework 508 that initiates a boot process 510 that boots up a monitor 512 that invokes a launcher 514 that launches components which execute stages in applying the template 504 to the application 506. The configuration template monitor 512 provides a configuration template monitoring service, and invokes the configuration template launcher 514, which queries the configuration template monitor 512 for the list of stages which are pending execution or have failed execution, and executes all four stages when run for the first time. During stage 1, the configuration template launcher 514 invokes a configuration template reader 516 to retrieve the configuration template 504, possibly from an instance metadata service 518. During stage 2, the configuration template launcher 514 invokes a configuration template feature generator 520 that uses the configuration template 504 to generate a list 522 of features that need to be applied to the instance of the backup and restore application 506. During stage 3, the configuration template launcher 514 invokes a configuration template feature sorter 524 which creates a sorted features list 526 by sorting the features list 522 based on feature dependencies. During stage 4, the configuration template launcher 514 invokes a configuration template applicator 528 to create an updated features list 530 by updating the sorted features list 526. Successful completion of all four stages results in configuring the instance of the backup and restore application 506.

The configuration template monitor 512 records the execution status of each stage. While using the deployment orchestration framework 502, the user can query the monitoring service provided by the configuration template monitor 512 to get the progress and overall status of the configuration of the instance of the backup and restore application 506. In case the configuration fails, the configuration template monitor 512 provides detailed information about the stage in which the configuration of the instance of the backup and restore application 506 failed, the errors which caused the failure, and the corrective action needed. If there are errors in any of the stages, the user has to correct the issue in that stage and invoke the configuration template launcher 514 again to continue with configuring the instance of the backup and restore application 506. The error handling paths for each of the four stages are described below in reference to the depiction of these error handling paths by FIG. 6 through FIG. 9.

At the start of the execution, the configuration template launcher 514 acquires the lock to the configuration template database 532 and will release the database lock at the end of its execution. The configuration template database 532 stores the features list 522, the sorted features list 526, the updated features list 530, and sometimes the configuration template 504. To deal with the possible scenario of database corruption, the system 500 synchronizes a copy of the configuration template database 532 to a backup partition.

Based on the public cloud provider implementation, the configuration template 504 is available either through the instance metadata service 518 or inside an instance of a backup and restore application 506. Once an instance of the backup and restore application 506 has booted up, the configuration template framework 508 retrieves the configuration template 504 from the instance metadata service 518 or from a stored location on the instance of the backup and restore application 506. In addition to FIG. 5 depicting an example of a public cloud provider that provisions the configuration template 504 through the instance metadata service 518, all the subsequent figures in this disclosure depict an example of a public cloud provider that provisions any configuration template through any corresponding instance metadata service.

Figure 6:
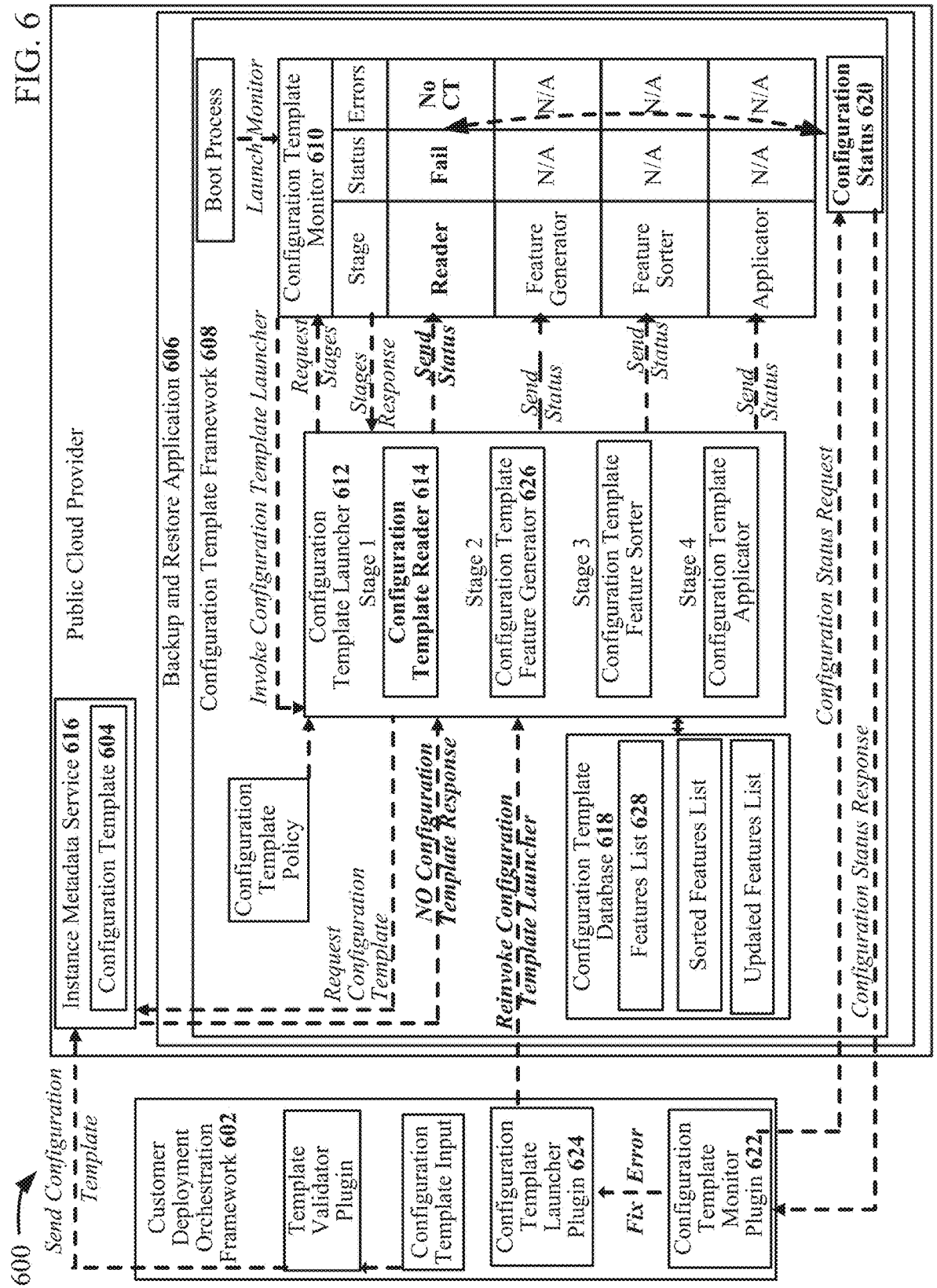
FIG. 6 illustrates a block diagram of an example system that depicts error handling for a configuration template reader, under an embodiment.

FIG. 6 illustrates a block diagram of an example system 600 that includes error handling for a configuration template reader, under an embodiment. The system 600 depicts a deployment orchestration framework 602 that provides a configuration template 604 for an instance of a backup and restore application 606, which includes a configuration template framework 608 that boots up a monitor 610 that invokes a launcher 612 that launches components which execute stages in applying the template 604 to the application 606. The configuration template launcher 612 launches a configuration template reader 614 that can retrieve the configuration template 604 from an instance metadata service 616, and can convert the configuration template 604 into the JSON format if the configuration template 604 is in the YAML format. The configuration template reader 614 reports its execution status to a configuration template monitor 610. After the successful execution of the configuration template reader 614, the configuration template 604 can also be saved in a configuration template database 618.

If the configuration template reader 614 fails (after retries) to retrieve the configuration template 604 from the instance metadata service 616, the configuration template monitor 610 logs a detailed error message and sends a configuration status 620 through the configuration template monitor plugin 622 in the deployment orchestration framework 602, which enables the user to review the detailed error message and any suggested corrective actions. The user attempts to correct any networking and/or configuration issue which is blocking access to the instance metadata service 616. After this correction, the user can reinvoke the configuration template launcher 612, through the configuration template launcher plugin 624 in the deployment orchestration framework 602, which relaunches the deployment and configuration process. Once the configuration template reader 614 retrieves the configuration template 604 from the instance metadata service 616, either after the first retrieval attempt or after the user executed corrective actions and then relaunched the deployment and configuration process, stage 1 is complete for the configuration template reader 614, and the process continues with stage 2, which requires a configuration template feature generator 626 to generate a list 628 of features from the retrieved configuration template 604.

Figure 7:
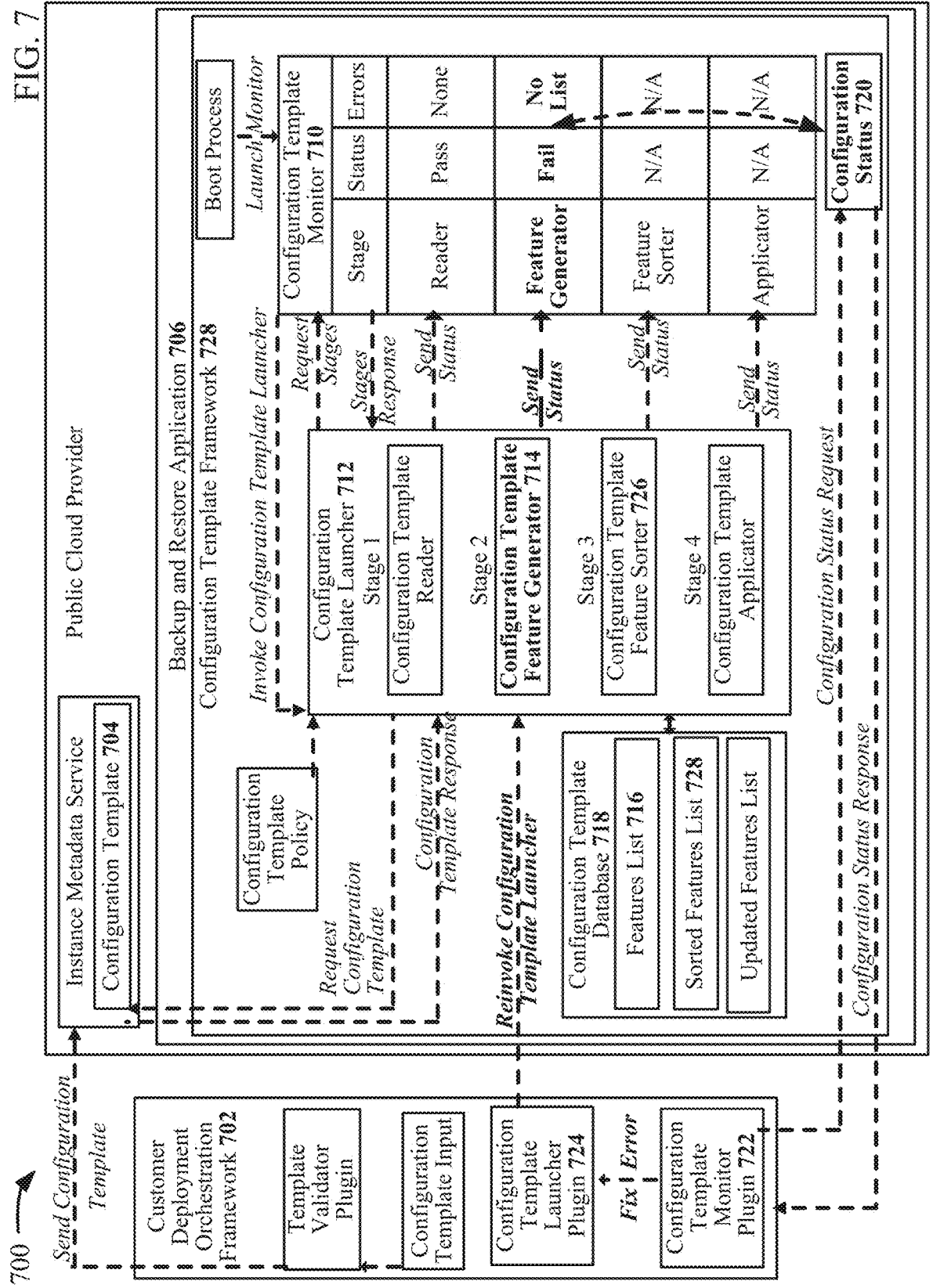
FIG. 7 illustrates a block diagram of an example system that depicts error handling for a configuration template feature generator, under an embodiment.

Following the configuration template reader 614 completing stage 1 of the deployment and configuration process by retrieving the configuration template 604 for an instance of a backup and restore application 606, the configuration template feature generator 626 begins stage 2 of the deployment and configuration process by generating a list 628 of features from the retrieved configuration template 604. FIG. 7 illustrates a block diagram of an example system 700 that depicts error handling for a configuration template feature generator, under an embodiment. The system 700 depicts a deployment orchestration framework 702 that provides a configuration template 704 for an instance of a backup and restore application 706, which includes a configuration template framework 708 that boots up a monitor 710 that invokes a launcher 712 that launches components which execute stages in applying the template 704 to the application 706.

The configuration template feature generator 714 can input one or two JSON files as the configuration template 704 for an instance of a backup and restore application 706, and generate a list 716 of features that need to be updated. In the case of two JSON files as inputs, the configuration template feature generator 714 generates the features list 716 based on the differences in the JSON files. The generated features list 716 can represent the feature set that the user selected to configure or update when using a generator and/or an editor to generate the configuration template 704.

The configuration template feature generator 714 can report its execution status to the configuration template monitor 710 which provides a monitoring service. After the successful generation of the features list 716, the configuration template feature generator 714 stores the generated features list 716 in the configuration template database 718. If there is any error in the generation of the features list 716, the configuration template monitor 710 logs a detailed error message and sends the configuration status 720 through the configuration template monitor plugin 722 in the deployment orchestration framework 702, which enables the user to review the detailed error message and any suggested corrective actions.

The user attempts to correct any error that may be causing the failure of the configuration template feature generator 714. After this correction, the user can reinvoke the configuration template launcher 712, through the configuration template launcher plugin 724 in the deployment orchestration framework 702, which relaunches the deployment and configuration process. Once the configuration template feature generator 714 generates the features list 716 from the configuration template 704, either after the first attempt to generate the features list 716 or after the user executed corrective actions and then relaunched the deployment and configuration process, stage 2 is complete for the configuration template feature generator 714, and the process continues with stage 3, which requires the configuration template feature sorter 726 to create a sorted list 728 by sorting the generated features list 716.

Figure 8:
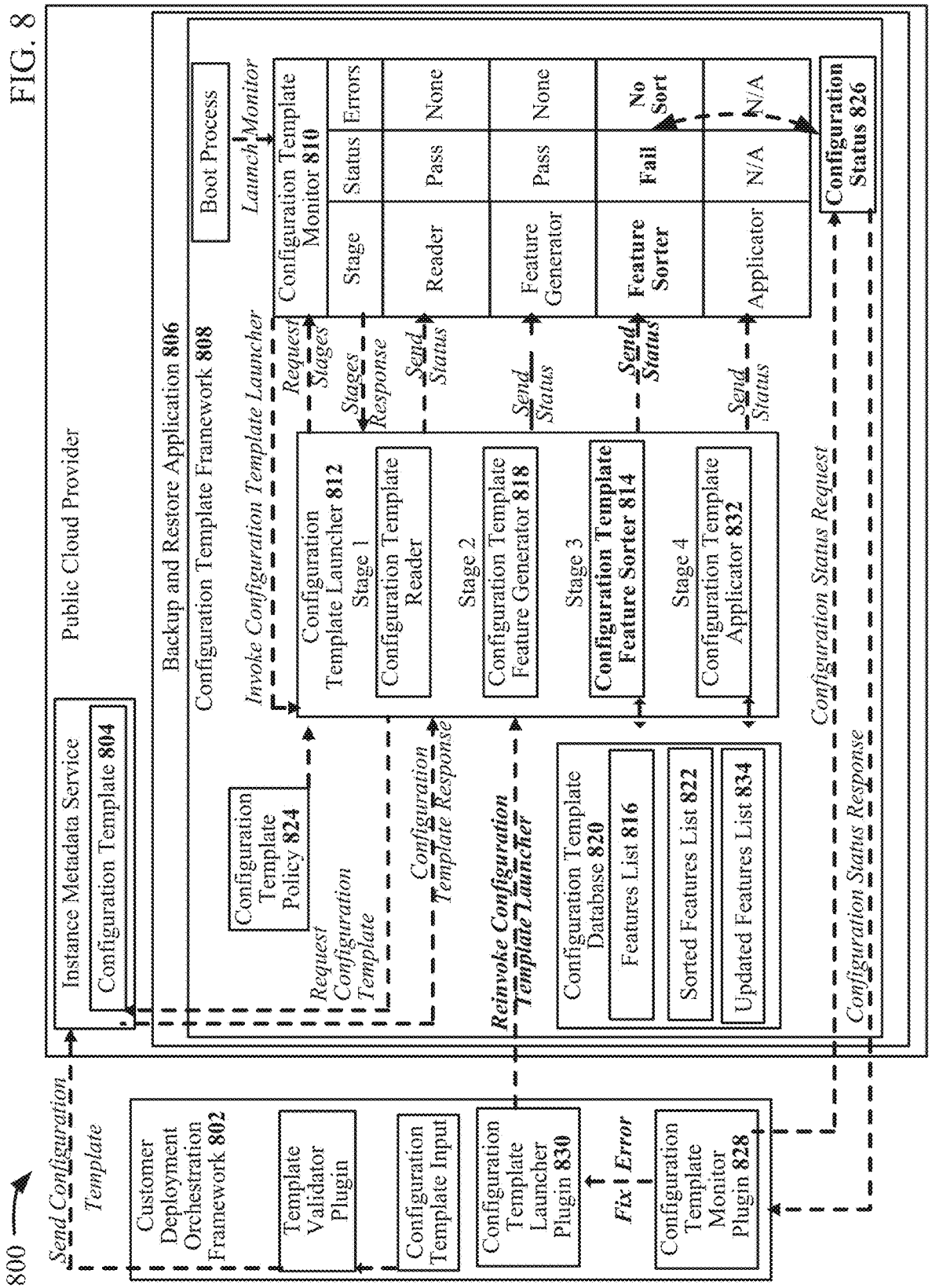
FIG. 8 illustrates a block diagram of an example system that depicts error handling for a configuration template feature sorter, under an embodiment.

Following the configuration template feature generator 714 completing stage 2 of the deployment and configuration process by generating a list 716 of features from the configuration template 704 for an instance of a backup and recovery application 706, the configuration template feature sorter 726 begins stage 3 of the deployment and configuration process by creating the sorted list 728 based on sorting the generated list 716 of features from the configuration template 704. FIG. 8 illustrates a block diagram of an example system 800 that depicts error handling for a configuration template feature sorter, under an embodiment. The system 800 depicts a deployment orchestration framework 802 that provides a configuration template 804 for an instance of a backup and restore application 806, which includes a configuration template framework 808 that boots up a monitor 810 that invokes a launcher 812 that launches components which execute stages in applying the template 804 to the application 806.

A configuration template feature sorter 814 inputs a features list 816, that the configuration template feature generator 818 generated from the configuration template 804 for an instance of the backup and restore application 806, from the configuration template database 820, and reorganizes the features in the features list 816 into a sorted features list 822 based on the order of execution from the dependency rules in the configuration template policy 824. The configuration template policy 824 defines dependencies amongst features and commands, listed in the configuration template 804, which are needed to configure an instance of the backup and restore application 806. Upon successful sorting, the configuration template feature sorter 814 saves the prioritized features in the sorted features list 822 in the configuration template database 820.

The configuration template feature sorter 814 reports its execution status to the configuration template monitor 810, which provides a monitoring service. After the successful generation of the sorted features list 822, the configuration template feature sorter 814 stores the sorted features list 822 in the configuration template database 820. If there is any error in the sorting of the features in the sorted features list 822, the configuration template monitor 810 logs a detailed error message and sends the configuration status 826 through the configuration template monitor plugin 828 in the deployment orchestration framework 802, which enables the user to review the detailed error message and any suggested corrective actions. The user attempts to correct any error that may be causing the failure of the configuration template feature sorter 814. After this correction, the user can reinvoke the configuration template launcher 812, through the configuration template launcher plugin 830 in the deployment orchestration framework 802, which relaunches the deployment and configuration process. Once the configuration template feature sorter 814 sorts the features list 816 from the configuration template 804, either after the first attempt to sort the features list 816 or after the user executed corrective actions and then relaunched the deployment and configuration process, stage 3 is complete for the configuration template feature sorter 814, and the process continues with stage 4, which requires a configuration template applicator to update the sorted features list 822.

Figure 9:
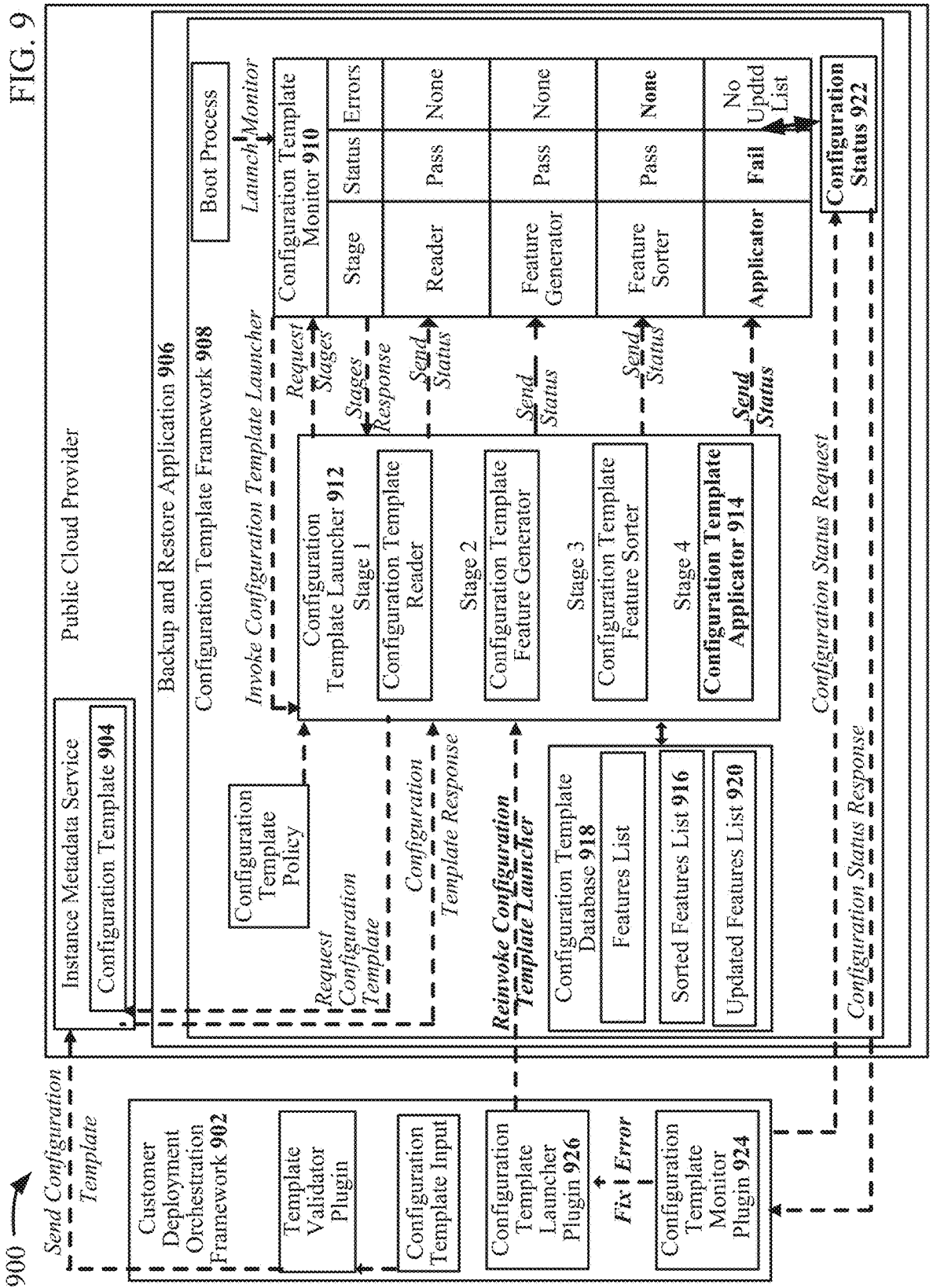
FIG. 9 illustrates a block diagram of an example system that depicts error handling for a configuration template applicator, under an embodiment.

Following the configuration template feature sorter 814 completing stage 3 of the deployment and configuration process by sorting the features list 816 from the configuration template 804 for an instance of a backup and restore application 806, a configuration template applicator 832 begins stage 4 of the deployment and configuration process by creating on updated list 834 based on updating the sorted features list 822. FIG. 9 illustrates a block diagram of an example system 900 that depicts error handling for a configuration template applicator, under an embodiment. The system 900 depicts a deployment orchestration framework 902 that provides a configuration template 904 for an instance of a backup and restore application 906, which includes a configuration template framework 908 that boots up a monitor 910 that invokes a launcher 912 that launches components which execute stages in applying the template 904 to the application 906.

The configuration template applicator 914 gets the sorted features list 916 from the configuration template database 918 and generates the corresponding commands for each feature. There could be multiple commands that need to be executed as a batched operation to configure a feature for the instance of the backup and restore application 906. The execution status of the individual commands and their corresponding feature is updated in the features list file. When ending execution, the configuration template applicator 914 saves the updated features list 920 in the configuration template database 918.

The configuration template applicator 914 can report its execution status to the configuration template monitor 910. After a successful execution of the configuration template applicator 914, a Data Domain File System is up and running and the instance of the backup and restore application 906 is fully operational to handle backup/replication workloads. The configuration template applicator 914 traverses the sorted features list 916 and handles their execution and errors based on their dependency.

Figure 10:
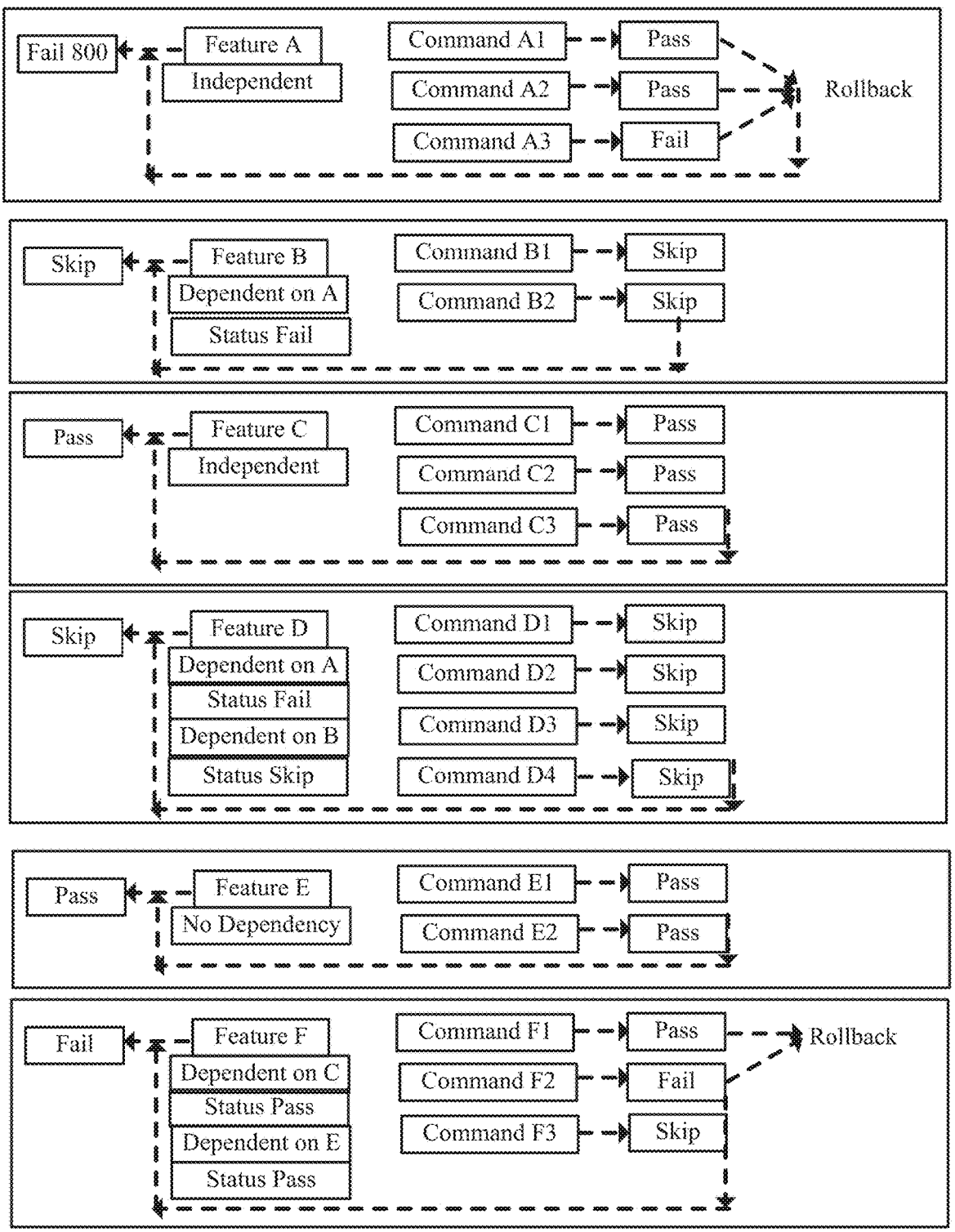
FIG. 10 illustrate a block diagram of an example system that depicts scenarios for error handling based on feature dependency, under an embodiment.

FIG. 10 illustrate a block diagram of an example system 1000 that includes scenarios for error handling based on feature dependency, under an embodiment. Typically, there are two different scenarios for error handling based on feature dependency. In the first type of scenario, the configuration template applicator 914 executes the constituent commands for a feature if the feature is independent or if the feature depends upon feature(s) that have been successfully configured. If any of these executed constituent commands fails, the configuration template applicator 914 rolls back all the corresponding executed commands for this feature. Then the configuration template applicator 914 updates the configuration template feature status and error message in the sorted features list 916, and proceeds to the next feature. In the second type of scenario, the configuration template applicator 914 skips the execution of a feature if the feature is dependent on other feature(s) and the execution of one of the dependent features has been skipped or failed, and then proceeds to the next feature.

Since feature A is independent, the configuration template applicator 914 executed the constituent commands A1, A2, and A3 for the feature A, However, because the constituent command A3 failed, the configuration template applicator 914 rolled back the constituent commands A1 and A2 that passed for feature A. Then the configuration template applicator 914 updated the configuration template feature status and error message in the sorted features list 916 to indicate that Feature A did not pass because constituent command A3 failed, and proceeded to the next feature B. Since feature B is dependent upon Feature A that has failed, the configuration template applicator 914 skipped the execution of the current feature B, updated the skipped status for the feature B in the updated features list 920, and proceeded to the next feature C. Since feature C is independent, the configuration template applicator 914 executed the constituent commands C1, C2, and C3, which all passed, and updated the configuration template feature status in the sorted features list 916 to indicate that the feature C passed.

Since feature D is dependent upon Feature A that has failed, the configuration template applicator 914 skipped the execution of the feature D, updated the skipped status for the feature D in the updated features list 920, and proceeded to the next feature E. Since feature E is independent (non-dependent), the configuration template applicator 914 executed the constituent commands E1 and E2, which all passed, and updated the configuration template feature status in the sorted features list 916 to indicate that the feature E passed. Since feature F is dependent on Feature C that has been successfully configured and Feature E that has been successfully configured, the configuration template applicator 914 executed the constituent commands F1, F2, and F3 for the feature F. However, because the constituent command F2 failed, the configuration template applicator 914 rolled back the constituent command F1 that passed for feature F, but did not need to roll back the constituent command F3 because the constituent command F3 skipped. Then the configuration template applicator 914 updated the configuration template feature status and error message in the sorted features list 916 to indicate that Feature F did not pass because constituent command F3 failed, and then terminated because no more features remained to be evaluated.

Returning to FIG. 9, if there is any error in the updating of the sorted features list 916 due to failed and/or skipped features, the configuration template monitor 910 logs a detailed error message and sends the configuration status 922 through the configuration template monitor plugin 924 in the deployment orchestration framework 902, which enables the user to review the detailed error message and any suggested corrective actions. The user attempts to correct any error that may be causing the failure of the configuration template applicator 914. After this correction, the user can reinvoke the configuration template launcher 912, through the configuration template launcher plugin 926 in the deployment orchestration framework 902, which relaunches the deployment and configuration process. Once the configuration template applicator 914 updates the sorted features list 916 from the configuration template 904, either after the first attempt to update the sorted features list 916 or after the user executed corrective actions and then relaunched the deployment and configuration process, stage 4 is complete for the configuration template applicator 914.

FIG. 11 illustrates a block diagram of an example system 1100 that includes a configuration template export process, under an embodiment. The system 1100 depicts a deployment orchestration framework 1102 that provides a configuration template 1104 for an instance of a backup and restore application 1106, which includes a configuration template framework 1108 that executes stages in applying the template 1104 to application 1106. In order to export an existing configuration template 1104 for an instance of the backup and restore application 1106, which can then be used as the configuration template 1104 for configuring other instances of the backup and restore application 1110, 1112, and 1114, a user invokes a configuration template generator 1116 to create the configuration template 1104 for an instance of the backup and restore application 1106. Then the user can invoke a configuration template editor 1118 to modify (if required) the configuration template 1104 as needed. Afterwards, the user can invoke the configuration template validator 1120 to check the template configuration 1104 for errors.

If there are any errors, the user can correct the errors by using the configuration template editor 1118 and rerun the configuration template validator 1120. The user can also invoke the configuration template validator 1120 to check the configuration template 1104 for any invalid or missing key pair values, and invoke a configuration template exporter 1122 to export the configuration template 1104 from an instance of the backup and restore application 1106 to apply it to other instances of the backup and restore application 1110, 1112, and 1114. The configuration template editor 1118 enables a user to modify the configuration template 1104 generated by the configuration template generator 1116 or provided as input to this tool. Then the user can instruct the configuration template exporter 1122 to export this configuration template 1104 for applying the configuration template 1104 on other instances of the backup and restore application 1110, 1112, and 1114.

Figure 12:
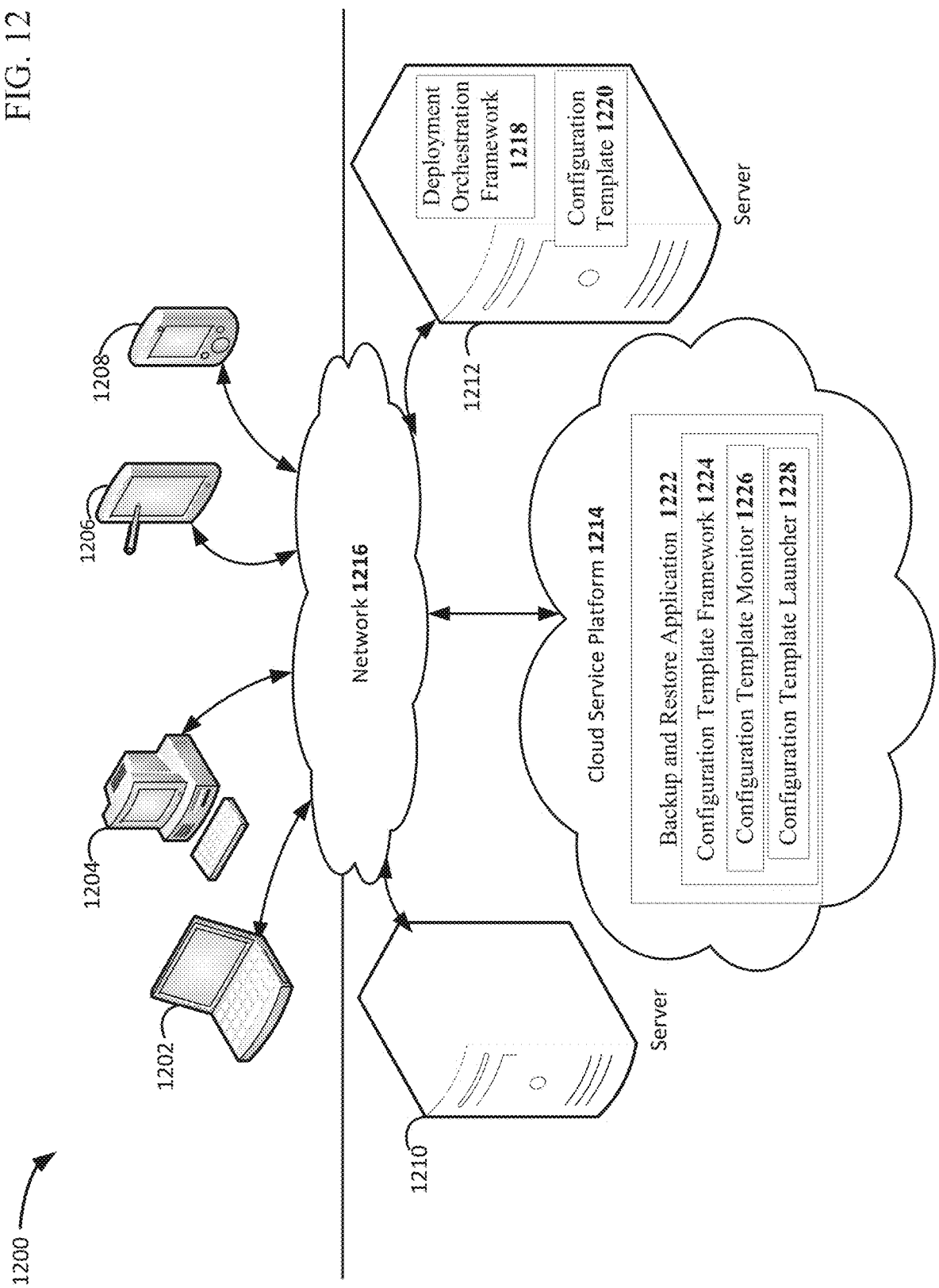
FIG. 12 illustrates a diagram of an example system for providing template-based configuration for backup and restore applications in a public cloud, under an embodiment.

FIG. 12 illustrates a diagram of an example system 1200 for providing template-based configuration for backup and restore applications in a public cloud, under an embodiment. As shown in FIG. 12, the system 1200 may illustrate a cloud computing environment in which data, applications, services, and other application resources are stored and delivered through shared data centers and appear as a single point of access for the users. The system 1200 may also represent any other type of distributed computer network environment in which servers control the storage and distribution of application resources and services for different client users.

In an embodiment, the system 1200 represents a cloud computing system that includes a first client 1202, a second client 1204, a third client 1206; a fourth client 1208; a server 1210, a cloud configuring server 1212, and a cloud service platform 1214. The first client 1202 may be a laptop computer 1202, the second client 1204 may be a desktop computer 1204, the third client 1206 may be a tablet computer 1206, and the fourth client 1208 may be a smart phone 1208. The clients 1202-1208, the servers 1210-1212, and the cloud service platform 1214 communicate via a network 1216. FIG. 12 depicts the system 1200 with four clients 1202-1208, two servers 1210-1212, one cloud service platform 1214, and one network 1216. However, the system 1200 may include any number of each of the clients 1202-1208, the servers 1210-1212, the cloud service platform 1216, and the network 1214. The system 1200 depicts a deployment orchestration framework 1218 that provides a configuration template 1220 for an instance of a backup and restore application 1222, which includes a configuration template framework 1224 that boots up a configuration template monitor 1226 that invokes a configuration template launcher 1228 that launches components which execute stages in applying the configuration template 1220 to backup and restore application 1222. Then the backup and restore application 1222 can create backup files of data objects for the clients 1202-1208, and can perform a restore operation based on the backup files stored on an object storage. The backup and restore application 1222 provides centralized administration, such as scheduling, monitoring, and managing backup operations and backup files. The backup and restore application 1222 enables the storing of backup operation schedules, client policies, and client configurations.

The backup and restore application 1222 provides a unique interface to the clients 1202-1208 during login, and assists the server 1210 in authenticating and registering the clients 1202-1208. The backup and restore application 1222 can send backup and restore work orders to the clients 1202-1208, which may receive and process the work orders to start a backup or restore operation. The backup and restore application 1222 may execute server-side processes for a system administrator's graphical management console, which may enable the system administrator to use command line interface tools for queries. Although this disclosure describes Dell's Data Domain Virtual Edition as an example of the backup and restore application 1222 the backup and restore application may be any other type of backup and restore application which provides the backup and restore functionalities described in this disclosure.

Figure 13:
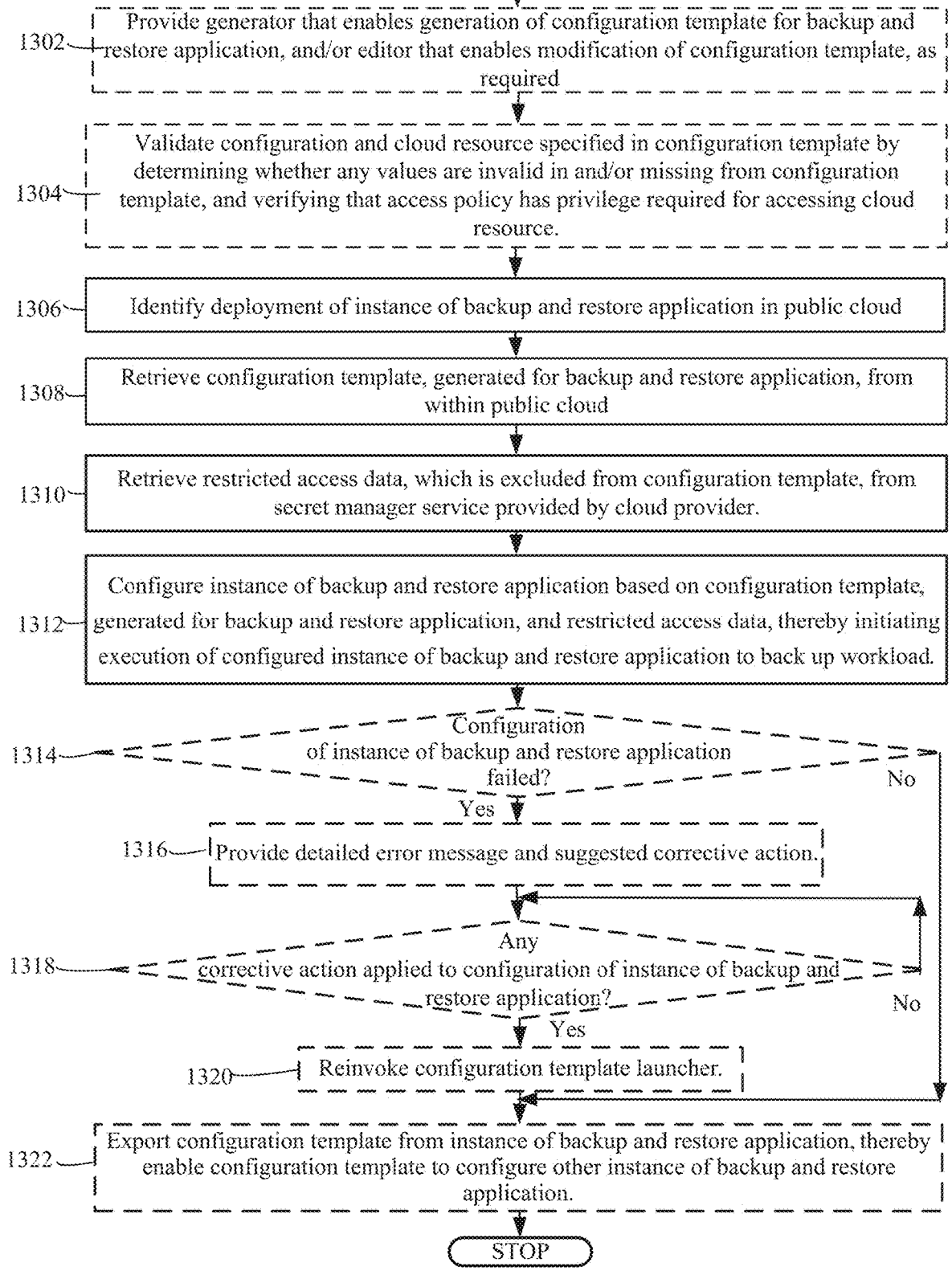
FIG. 13 is a flowchart that illustrates a method for providing template-based configuration for backup and restore applications in public clouds, under an embodiment.

FIG. 13 is a flowchart 1300 that illustrates a method for providing template-based configuration for backup and restore applications in public clouds, under an embodiment. Flowchart 1300 depicts method acts illustrated as flowchart blocks for certain steps involved in the clients 1202-1208, the servers 1210-1212, the cloud service platform 1214, and/or the network 1216 of FIG. 12.

A generator that enables generating a configuration template for an instance of a backup and restore application, and/or an editor that enables modifying the configuration template, as required, are optionally provided, block 1302. A system can generate and edit configuration templates for instances of backup and restore applications. For example, and without limitation, this can include the system 1100 providing the configuration template generator 1116, which enables a customer's data protection administrator to generate a configuration template 1104 for the instance of the Data Domain Virtual Edition 1106 that had proven to be very popular with a large number of the customer's employees, and the configuration template editor 1118, which enables the customer's data protection administrator to slightly modify the configuration template 1104 to update new features for the customer, as depicted by FIG. 11.

A generator can be a routine that constructs other routines or subroutines using given parameters for specific applications. A configuration template can be a file that serves as a starting point for generating a new file, which contains placeholder fields which can be filled in to define the manner in which components and subcomponents are arranged to make up a computer system. An instance can be a single occurrence of a software application, service, or virtual machine running on a server. A backup and restore application can be deduplication software that optimizes data storage by removing redundant data stored on object storage. An editor can be a computer program that is utilized to create, revise, update, and/or format files on a computer.

After a configuration template for an instance of a backup and restore application is generated, a configuration and a cloud resource specified in the configuration template are optionally validated by determining whether any values are invalid in and/or missing from the configuration template, and verifying an access policy has a privilege required for accessing a cloud resource, block 1304. The system validates configuration templates and their cloud resources before the configuration template is deployed. By way of example and without limitation, this can include the configuration template validator plugin 314 receiving the configuration template 304 from the deployment orchestration framework 302, and checking the validity of the configuration specified in the configuration template 304 by capturing any static configuration errors such as missing or invalid key pair values in the configuration template 304, as depicted by FIG. 3. A configuration can be the manner in which components and subcomponents are arranged to make up a computer system. A value can be the representation of some entity that can be manipulated by a program. Invalid can be a value that is not defined for its class or type.

The configuration template validator plugin 314 can also help to minimize failures related to use of cloud resources 316 for configuration of the instance of the backup and restore application 306, by checking that the policy for object store access has all the required privileges for bucket access. An access policy can be the goals and elements of an organization's computer systems which assign permission to use computer data or resources in some manner. A privilege can be the authority to perform relevant functions on a computer system. A cloud resource can be any asset accessible by a distributed collection of servers that host software and infrastructure, and accessed over the Internet.

If the validation fails, the corresponding cloud resources and/or the configuration template might need to be updated, and the configuration template editor may be used to correct the problem. If the validation succeeds, or does not fail, the deployment orchestration framework can proceed to deploy an instance of a backup and restore application.

Following the validation of a configuration template for an instance of a backup and restore application, a deployment of an instance of the backup and restore application is identified in a public cloud, block 1306. The system identifies when a backup and restore application instance is deployed and needs to be configured by a configuration template. In embodiments, this can include the configuration template framework 608 for the deployed Data Domain Virtual Edition instance identifying that the customer's deployment orchestration framework 602 deployed the Data Domain Virtual Edition instance in a Google Cloud Platform, as depicted by FIG. 6. A deployment can be the process of setting up a new computer or system to the point where it is ready for productive work in a live environment. A public cloud can be networked computing facilities providing remote data storage and processing services via the internet.

Having identified the deployment of an instance of a backup and restore application in a public cloud, a configuration template, generated for the instance of the backup and restore application, is retrieved from within the public cloud, block 1308. The system retrieves the configuration template for the deployed instance of the backup and restore application. For example, and without limitation, this can include the configuration template framework 608 retrieving the configuration template 604 from the Google Cloud Platform's instance metadata service 616 which corresponds to the deployed Data Domain Virtual Edition instance, as depicted by FIG. 6.

A configuration template may have been transferred from a location in a deployment orchestration framework, by executing a method which is an industry standard for initializing a public cloud, to one of an instance metadata service which is native to the public cloud or a location in an instance of a backup and restore application. For example, a configuration template 604 was generated for a Data Domain Virtual Edition, stored in the user data section of a customer's deployment orchestration framework 602, and then provisioned by a customer using the cloud-init technology to provision the user data to the Google Cloud Platform's instance metadata service 616 or to a specific location in a Data Domain Virtual Edition instance, as depicted by FIG. 6. A deployment orchestration framework can be a structured abstraction for the automated configuring, coordinating, managing and delivering of software to users. A method can be a programmed procedure. An industry standard can be a customary or usual practice in the delivery of products or services within a particular business sector. An instance metadata service can be software that performs automated tasks conveying the information that describe a specific realization of an object. Native can be a particular platform or device for which developers built a software program. A location can be any place in computer memory in which an item of data can be stored in binary form.

After retrieving a configuration template, generated for a backup and restore application, from within a public cloud, restricted access data, which is excluded from the configuration template, is retrieved from a secret manager service provided by a cloud provider associated with the public cloud, block 1310. The system retrieves the configuration data which is missing from a configuration template but is still needed for configuring an instance of a backup and restore application. By way of example and without limitation, this can include the configuration template framework 408 retrieving the Data Domain Virtual Edition's system passphrase 410 and user passwords from the Google Cloud Platform's highly secure secret manager service 412, where the Data Domain Virtual Edition's access system passphrases 410 and user passwords were stored by the customer's data protection administrator, as depicted in FIG. 4. These passphrases and passwords would be at risk of unauthorized access if these "secret" data were provided as part of a configuration template 404 stored in the Google Cloud Platform's instance metadata service. Restricted access data can be computer information that is stored by a computer system and has limited permission to use. A secret manager service can be software that listens for requests and unlocks protected resources or sensitive information.

Following the retrieving of restricted access data, which is excluded from a configuration template, an instance of a backup and restore application is configured based on the configuration template, generated for the backup and restore application, and the restricted access data, thereby initiating execution of the instance of the backup and restore application to back up a workload, block 1312. The system uses the configuration template and the restricted access data to configure the instance of the backup and restore application. In embodiments, this can include the configuration template framework 408 using both the Data Domain Virtual Edition's configuration template 404 and the system passphrases 410 and user passwords to create a slightly modified version of the most popular Data Domain Virtual Edition instance, which is executed to process an enterprise's backup workload, as depicted by FIG. 4. A backup and restore workload can be a type of Internet-based processing that remotely provides shared processing resources and data to processors and other devices on demand.

Having configured an instance of a backup and restore application, a determination is optionally made whether the configuration failed, block 1314. The system checks whether the configuration of the instance of the backup and restore application failed. For example, and without limitation, this can include the configuration template monitor plugin 318 receiving a remote procedure call from the deployment orchestration framework 302 and then querying the status of the configuration of the deployed Data Domain Virtual Edition instance from the configuration template monitor 310, as depicted by FIG. 3. If the configuration of the instance of the backup and restore application failed, the method 1300 continues to block 1316 to provide a user with a detailed error message and a suggested corrective action. If the configuration of the instance of the backup and restore application did not fail, the method 1300 proceeds to block 1322 to optionally export the configuration template.

If the configuration of the instance of the backup and restore application failed, a detailed error message and a suggested corrective action are optionally provided, block 1316. The system responds to any configuration failures by explaining why the configuration failed and how to fix the failed configuration. By way of example and without limitation, this can include the configuration template monitor plugin 318 receiving a remote procedure call from the deployment orchestration framework 302 and then providing a customer's data protection administrator with a detailed error message about why the configuration failed for the deployed Data Domain Virtual Edition instance and a suggested corrective action about how to correct the failure for the configuration of the deployed Data Domain Virtual Edition instance, as depicted by FIG. 3. A detailed error message can be a brief segment of data or information which is transmitted over a network that is intended for human interpretation, and which is about any issue that arises unexpectedly that cause a computer to not function properly. A suggested corrective action can be commands or tasks which are offered for consideration, by a program code, to be carried out to restore operability to a system.

After a detailed error message and a suggested corrective action are provided, a determination is optionally made whether any corrective action is applied to a configuration of an instance of a backup and restore application, block 1318. The system determines if the failed configuration is corrected. In embodiments, this can include the system determining whether the suggested corrective action is applied to the failed configuration of Dota Domain Virtual Edition instance. A corrective action can be commands or tasks to restore operability to a computer system. If a corrective action is applied to the configuration of the instance of the backup and restore application, the method 1300 continues to block 1320 to reinvoke the configuration template launcher. If a corrective action is not yet applied to the configuration of the instance of the backup and restore application, the method 1300 returns to block 1318 to continue waiting until it is determined that any corrective action is applied to the configuration of the instance of the backup and restore application.

If a suggested corrective action is applied to a configuration of an instance of a backup and restore application, the configuration template launcher is optionally reinvoked, block 1320. The system restarts the correctly reconfigured backup and restore application. For example, and without limitation, this can include the configuration template launcher plugin 320 receiving a remote procedure call from the deployment orchestration framework 302, and then reinvoking the configuration template launcher 312, as depicted by FIG. 3.

After an instance of a backup and restore application is configured based on a configuration template, the configuration template is optionally exported from the instance of the backup and restore application, thereby optionally enabling the configuration template to configure another instance of the backup and restore application, block 1322. The system can apply a configuration template that successfully configured an instance of a backup and restore application to any number of other instances of the backup and restore application. By way of example and without limitation, this can include the system exporting the configuration template from the Data Domain Virtual Edition instance and using the configuration template to configure another instance of the Data Domain Virtual Edition.

Although FIG. 13 depicts the blocks 1302-1322 occurring in a specific order, the blocks 1302-1322 may occur in another order. In other implementations, each of the blocks 1302-1322 may also be executed in combination with other blocks and/or some blocks may be divided into a different set of blocks.

Figure 14:
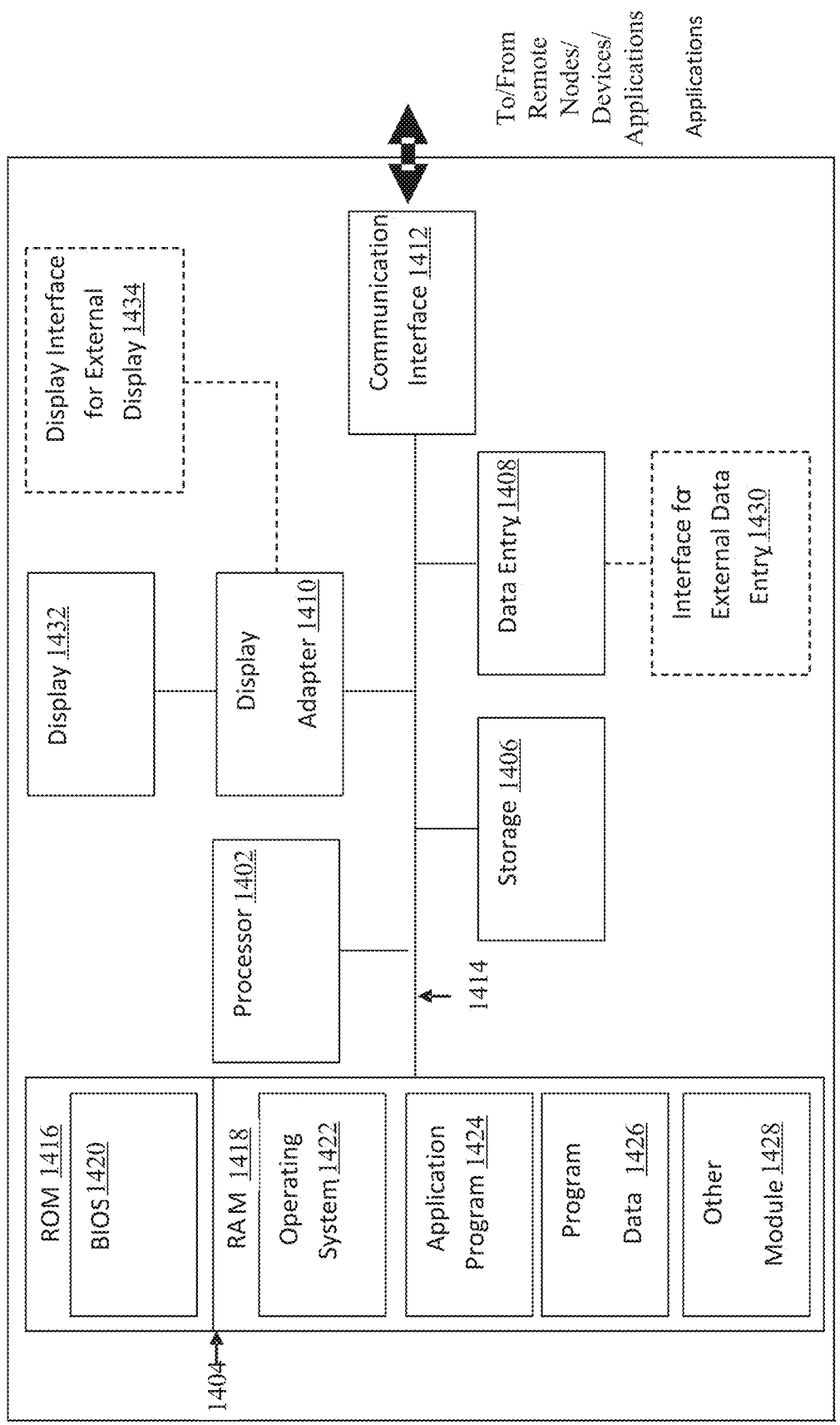
FIG. 14 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 14 may vary depending on the system implementation. With reference to FIG. 14, an exemplary system for implementing the subject matter disclosed herein includes a hardware device 1400, including a processing unit 1402, memory 1404, storage 1406, a data entry module 1408, a display adapter 1410, a communication interface 1412, and a bus 1414 that couples the elements 1404-1412 to the processing unit 1402.

The bus 1414 may comprise any type of bus architecture. Examples include a memory bus, a peripheral bus, a local bus, etc. The processing unit 1402 is an instruction execution machine, apparatus, or device and may comprise a microprocessor, a digital signal processor, a graphics processing unit, an application specific integrated circuit (ASIC), a field programmable gate array (FPGA), etc. The processing unit 1402 may be configured to execute program instructions stored in the memory 1404 and/or the storage 1406 and/or received via the data entry module 1408.

The memory 1404 may include read only memory (ROM) 1416 and random-access memory (RAM) 1418. The memory 1404 may be configured to store program instructions and data during operation of the hardware device 1400. In various embodiments, the memory 1404 may include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example.

The memory 1404 may also include nonvolatile memory technologies such as nonvolatile flash RAM (NVRAM) or ROM. In some embodiments, it is contemplated that the memory 1404 may include a combination of technologies such as the foregoing, as well as other technologies not specifically mentioned. When the subject matter is implemented in a computer system, a basic input/output system (BIOS) 1420, containing the basic routines that help to transfer information between elements within the computer system, such as during start-up, is stored in the ROM 1416.

The storage 1406 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD, or other optical media. The drives and their associated computer-readable media provide nonvolatile storage of computer readable instructions, data structures, program modules and other data for the hardware device 1400. It is noted that the methods described herein may be embodied in executable instructions stored in a computer readable medium for use by or in connection with an instruction execution machine, apparatus, or device, such as a computer-based or processor-containing machine, apparatus, or device.

It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for conducting the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high-definition DVD (HD-DVD™), a BLU-RAY disc; and the like.

A number of program modules may be stored on the storage 1406, the ROM 1416 or the RAM 1418, including an operating system 1422, one or more applications programs 1424, program data 1426, and other program modules 1428. A user may enter commands and information into the hardware device 1400 through the data entry module 1408. The data entry module 1408 may include mechanisms such as a keyboard, a touch screen, a pointing device, etc. Other external input devices (not shown) are connected to the hardware device 1400 via an external data entry interface 1430.

By way of example and not limitation, external input devices may include a microphone, joystick, game pad, satellite dish, scanner, or the like. In some embodiments, external input devices may include video or audio input devices such as a video camera, a still camera, etc. The data entry module 1408 may be configured to receive input from one or more users of the hardware device 1400 and to deliver such input to the processing unit 1402 and/or the memory 1404 via the bus 1414.

A display 1432 is also connected to the bus 1414 via the display adapter 1410. The display 1432 may be configured to display output of the hardware device 1400 to one or more users. In some embodiments, a given device such as a touch screen, for example, may function as both the data entry module 1408 and the display 1432. External display devices may also be connected to the bus 1414 via an external display interface 1434. Other peripheral output devices, not shown, such as speakers and printers, may be connected to the hardware device 1400.

The hardware device 1400 may operate in a networked environment using logical connections to one or more remote nodes (not shown) via the communication interface 1412. The remote node may be another computer, a server, a router, a peer device, or other common network node, and typically includes many or all the elements described above relative to the hardware device 1400. The communication interface 1412 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 1412 may include logic configured to support direct memory access (DMA) transfers between the memory 1404 and other devices.

In a networked environment, program modules depicted relative to the hardware device 1400, or portions thereof, may be stored in a remote storage device, such as, for example, on a server. It will be appreciated that other hardware and/or software may be used to establish a communications link between the hardware device 1400 and other devices.

The arrangement of the hardware device 1400 illustrated in FIG. 14 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 1400.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 14.

Other components may be implemented in software, hardware, or a combination of software and hardware. Moreover, some or all these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation to encompass all such modifications and similar arrangements.

What is claimed is:

1. A system for providing template-based configuration for backup and restore applications in public clouds, comprising:
   one or more processors; and
   a non-transitory computer readable medium storing a plurality of instructions, which when executed, cause the one or more processors to:
   retrieve a configuration template, generated for a backup and restore application, from within a public cloud, in response to identifying a deployment of an instance of the backup and restore application in the public cloud;
   retrieve restricted access data, which is excluded from the configuration template, from a secret manager service provided by a cloud provider associated with the public cloud;
   configure the instance of the backup and restore application based on the configuration template, generated for the backup and restore application, and the restricted access data, thereby initiating execution of the configured instance of the backup and restore application to back up a workload.

2. The system of claim 1, wherein the plurality of instructions further causes the processor to provide at least one of a generator that enables generation of the configuration template for the backup and restore application, or an editor that enables modification of the configuration template, as required.

3. The system of claim 1, wherein the plurality of instructions further causes the processor to validate a configuration and a cloud resource specified in the configuration template by determining whether any values are at least one of invalid in or missing from the configuration template, and verifying that an access policy has a privilege required for accessing a cloud resource.

4. The system of claim 1, wherein the configuration template was transferred from a location in a deployment orchestration framework, by executing a method which is an industry standard for initializing the public cloud, to one of an instance metadata service which is native to the public cloud or a location in the instance of the backup and restore application.

5. The system of claim 1, wherein the plurality of instructions further causes the processor to determine whether a configuration of the instance of the backup and restore application failed, and provide a detailed error message and a suggested corrective action, in response to a determination that the configuration of the instance of the backup and restore application failed.

6. The system of claim 5, wherein the plurality of instructions further causes the processor to reinvoke a configuration template launcher in response to a determination that any corrective action is applied to the configuration of the instance of the backup and restore application.

7. The system of claim 1, wherein the plurality of instructions further causes the processor to export the configuration template from the instance of the backup and restore application instance, thereby enabling the configuration template to configure another instance of the backup and restore application.

8. A computer-implemented method for providing template-based configuration for backup and restore applications in public clouds, comprising:
   retrieving a configuration template, generated for a backup and restore application, from within a public cloud, in response to identifying a deployment of an instance of the backup and restore application in the public cloud;
   retrieving restricted access data, which is excluded from the configuration template, from a secret manager service provided by a cloud provider associated with the public cloud; and
   configuring the instance of the backup and restore application based on the configuration template, generated for the backup and restore application, and the restricted access data, thereby initiating execution of the configured instance of the backup and restore application to back up a workload.

9. The computer-implemented method of claim 8, wherein the computer-implemented method further comprises providing at least one of a generator that enables generation of the configuration template for the backup and restore application, or an editor that enables modification of the configuration template, as required.

10. The computer-implemented method of claim 8, wherein the computer-implemented method further comprises validating a configuration and a cloud resource specified in the configuration template by determining whether any values are at least one of invalid in or missing from the configuration template, and verifying that an access policy has a privilege required for accessing a cloud resource.

11. The computer-implemented method of claim 8, wherein the configuration template was transferred from a location in a deployment orchestration framework, by executing a method which is an industry standard for initializing the public cloud, to one of an instance metadata service which is native to the public cloud or a location in the instance of the backup and restore application.

12. The computer-implemented method of claim 8, wherein the computer-implemented method further comprises determining whether a configuration of the instance of the backup and restore application failed, and providing a detailed error message and a suggested corrective action, in response to a determination that the configuration of the instance of the backup and restore application failed.

13. The computer-implemented method of claim 12, wherein the computer-implemented method further comprises reinvoking a configuration template launcher in response to a determination that any corrective action is applied to the configuration of the instance of the backup and restore application.

14. The computer-implemented method of claim 8, wherein the computer-implemented method further comprises exporting the configuration template from the instance of the backup and restore application instance, thereby enabling the configuration template to configure another instance of the backup and restore application.

15. A computer program product, comprising a non-transitory computer-readable medium having a computer-readable program code embodied therein to be executed by one or more processors, the program code including instructions to:
   retrieve a configuration template, generated for a backup and restore application, from within a public cloud, in response to identifying a deployment of an instance of the backup and restore application in the public cloud;
   retrieve restricted access data, which is excluded from the configuration template, from a secret manager service provided by a cloud provider associated with the public cloud; and
   configure the instance of the backup and restore application based on the configuration template, generated for the backup and restore application, and the restricted access data, thereby initiating execution of the configured instance of the backup and restore application to back up a workload.

16. The computer program product of claim 15, wherein the program code includes further instructions to provide at least one of a generator that enables generation of the configuration template for the backup and restore application, or an editor that enables modification of the configuration template, as required.

17. The computer program product of claim 15, wherein the program code includes further instructions to validate a configuration and a cloud resource specified in the configuration template by determining whether any values are at least one of invalid in or missing from the configuration template, and verifying that an access policy has a privilege required for accessing a cloud resource.

18. The computer program product of claim 15, wherein the configuration template was transferred from a location in a deployment orchestration framework, by executing a method which is an industry standard for initializing the public cloud, to one of an instance metadata service which is native to the public cloud or a location in the instance of the backup and restore application.

19. The computer program product of claim 18, wherein the program code includes further instructions to determine whether a configuration of the instance of the backup and restore application failed, provide a detailed error message and a suggested corrective action, in response to a determination that the configuration of the instance of the backup and restore application failed, and reinvoke a configuration template launcher in response to a determination that any corrective action is applied to the configuration of the instance of the backup and restore application.

20. The computer program product of claim 15, wherein the program code includes further instructions to export the configuration template from the instance of the backup and restore application instance, thereby enabling the configuration template to configure another instance of the backup and restore application.

\* \* \* \* \*